US006798343B2

(12) United States Patent
Carrier et al.

(10) Patent No.: US 6,798,343 B2
(45) Date of Patent: Sep. 28, 2004

(54) MOBILE EMERGENCY RESPONSE PLATFORM

(75) Inventors: Brian E. Carrier, Eldred, PA (US); Pamela M. Baughman, Lewis Run, PA (US)

(73) Assignee: Carba Fire Technologies, Inc., Lewis Run, PA (US)

( * ) Notice: Subject to any disclaimer, the term of this patent is extended or adjusted under 35 U.S.C. 154(b) by 0 days.

(21) Appl. No.: 10/663,344

(22) Filed: Sep. 15, 2003

(65) Prior Publication Data

US 2004/0130461 A1 Jul. 8, 2004

Related U.S. Application Data

(63) Continuation-in-part of application No. 09/574,888, filed on May 19, 2000, now abandoned.

(51) Int. Cl.[7] ................................................. G08B 1/08
(52) U.S. Cl. ............................ 340/539.13; 340/539.28; 340/601; 701/21; 701/24; 701/32; 701/213
(58) Field of Search ....................... 340/539.13, 539.28, 340/901, 436, 425.5, 449, 601, 988, 991; 180/116; 296/181.1; 701/1, 21, 32, 33, 50, 200, 208, 213

(56) References Cited

U.S. PATENT DOCUMENTS

| | | | |
|---|---|---|---|
| 4,981,188 A | 1/1991 | Kadela ...................... 180/9.25 |
| 5,463,384 A | 10/1995 | Juds ............................ 340/903 |
| 5,594,364 A | 1/1997 | Chan et al. .................. 280/781 |
| 5,612,667 A | 3/1997 | Trumpy et al. .......... 340/425.5 |
| 5,913,917 A | 6/1999 | Murphy ....................... 701/123 |
| 5,995,903 A | 11/1999 | Smith et al. ................. 701/211 |
| 6,029,750 A | 2/2000 | Carrier ......................... 169/52 |
| 6,148,261 A | 11/2000 | Obradovich et al. ........ 701/208 |
| 6,154,699 A | 11/2000 | Williams ..................... 701/50 |
| 6,161,071 A | 12/2000 | Shuman et al. ............... 701/48 |
| 6,255,942 B1 * | 7/2001 | Knudsen ...................... 340/506 |
| 6,538,622 B1 * | 3/2003 | Kojima et al. .............. 340/901 |
| 6,564,127 B1 * | 5/2003 | Bauerle et al. ............... 701/33 |

OTHER PUBLICATIONS

Sales Brochure for Topo USA.
Argo at Work Brochure, Ontario Drive & Gear Ltd.
Carba Brochure—Wildland Emergency Response Vehicle.
Carba Brochure—All Terrain Emergency Medical Vehicle.
U. S. Marine Corps Fact File—Light Armored Vehicle—Logistics (LAV–L).
U. S. Marine Corps Fact File—Light Armored Vehicle-25 (LAV–25).
U. S. Marine Corps Fact File—Light Armored Vehicle Anti–Tank (LAV–AT).
U. S. Marine Corps Fact File—Light Armored Vehicle—Command & Control (LAV–C2).
Ontario Drive & Gear Unlimited Brochure—Centaur.

(List continued on next page.)

Primary Examiner—Davetta W. Goins
(74) Attorney, Agent, or Firm—Edward W. Goebel, Jr.; Jon L. Woodard; MacDonald Illig Jones & Britton LLP

(57) ABSTRACT

A mobile emergency response platform is based on an all-terrain vehicle of the type that can accommodate at least two persons and has the capability, without requiring in-field modification by an operator, of traversing multiple off-road surfaces that include, at minimum, each of sand, mud, snow, swampland, thickly wooded areas, ice, grasslands, man-made rubble and debris, surfaces having angles of about at least thirty degrees from horizontal, and the floatable operation of the vehicle on waterways. Electronic communication equipment can receive at least two types of wireless communication transmissions. The platform can also transmit at least two types of wireless communication transmissions. The electronic communication equipment can also perform crossover and amplification of different types of signals. An environmental monitoring station is capable of taking in-field measurements of environmental conditions surrounding said platform.

101 Claims, 8 Drawing Sheets

OTHER PUBLICATIONS

Satcom Solutions—Mobile Satellite Unit from website.
Swe Dish Satellite Systems Brochure from website.
global–defence.com web site—A visual aid when the heat is on, Oct. 17, 2003.
Ground Systems brochure—ThermoVision Ranger—long range surveillance system, 2001.
groupmobile.com web site, product summary, Nov. 4, 2003.
superwinch.com web site, New ATV 3000 information, Nov. 4. 2003.
kenwood.com web site, land mobile radio products, Nov. 4, 2003.
gobookmax.com web site, Itronix information, Nov. 4, 2003.
delorme.com web site, The New Earthmate GPS Receiver, Nov. 4, 2003.
oregonscientific.com web site, Professional Home Weather Station, Nov. 4, 2003.
defensegroupinc.com web site, Cobra Family of Products & Svs., Nov. 4, 2003.
golight.com web site, Golight Product Information, Nov. 4, 2003.
qualcomm.com web site, Qualcomm Globalstar Satellite Phones, Nov. 4, 2003.

* cited by examiner

MOBILE EMERGENCY RESPONSE PLATFORM

This application is a continuation-in-part of non-provisional patent application Ser. No. 09/574,888 filed on May 19, 2000, now abandoned, which is incorporated herein by reference.

BACKGROUND

Emergency situations can arise in remote areas that are not accessible by roads or pathways. Such emergency situations can include activities surrounding the rescue and retrieval of downed aircraft, forest fires, natural disasters, rural terrorist attacks, coordinated searches for lost or missing persons, rural manhunts, and accidental ecological poisonings which can include nuclear, chemical, or biological discharges. However, due to the remoteness of a given location, it may be necessary that multiple emergency response parties be deployed over a large geographic area. For effective coordination of such efforts, it is crucial that each party be enabled to maintain communications with a central command center and/or with each other.

Individual response parties can range from single individuals on foot to additional response vehicles and aircraft. Some situations may also involve different types of emergency response services from different areas of the country. Consequently, the communications and response equipment carried by each party can vary greatly and be incompatible with those of other parties. In some circumstances, effective emergency response may require the addition of administration or expertise by personnel that are located tens, hundreds, or even thousands of miles away from the location of the emergency situation. However, response parties that are on foot may be limited by the fact that hand held communication equipment can be of limited range.

As response parties enter and remain present in the field, their ability to perform emergency operations often depends upon both observable and non-observable environmental conditions. Such environmental conditions can include natural factors such as barometric pressure, wind velocity and temperature as well as man-made factors such as the presence of radioactive fallout and chemical and biological agents. It can be crucial for in-field personnel to remain informed about current and changing environmental conditions, though it may be impractical or impossible for personnel to carry the necessary measuring instrumentation into the field with them. In the case of firefighting, for example, the fire fighters need to constantly be aware of wind velocities. If winds shift, for example, the angle of attack and strategy for fighting a fire may have to be changed. Thus, personnel may have to rely on their wireless communication devices to receive environmental information as it is measured from a remote location.

Command, communication linking, and environmental monitoring operations may have to be conducted at a location that is physically in or near the field of the emergency situation. Given range limits on the personal communication devices of response parties and the advantages of taking environmental measurements in the vicinity of the emergency situation, a platform for conducting emergency response command operations must often be able penetrate deep into even the most inaccessible or remote locations when an emergency situation erupts there. Such locations may be separated from the nearest road, trail, or pathway by great distances and by various terrains that can include sand, mud, snow, ice, deep water, swamps, thickly wooded areas, grasslands, man made debris and obstacles such as stairways, concrete, sharp metal, and glass, and terrains exhibiting extreme vertical angles. Thus, an effective platform for quickly responding to such remote emergencies must be able to move across multiple different types of off-road environments without modification immediately preceding or during an emergency operation.

Previous attempts to integrate command, communication, and environmental monitoring operations during an emergency situation based in aircraft or at fixed locations have been limited by the inability of coordinators and administrators to get to the scene of the crisis so as to provide on-the-spot command with a knowledge of the environmental conditions of the incident. From a remote location, direct environmental measurements may not be possible. The high speed of aircraft and the distances of fixed command centers from the vicinity of the emergency situation can also make it difficult or impossible for in-field response parties to use their personal communication equipment to correspond with such command centers. Attempts to integrate such command centers using a base vehicle such as a tractor trailer, four-wheel or truck-style of vehicle have been limited since none of these vehicles can be used to traverse off-trail areas that are heavily wooded, full of the thickest swamps, mud, ice, or snow, or that require the crossing of deep waterways, i.e. amphibious operation.

Simply recognizing that it is important to coordinate among multiple parties and vehicles that are involved in an emergency response operation does not itself dictate the choice of platform for the coordinating function of the choice of information and presentation format. Thus, there remains a need for a way to control, coordinate, and administer the various parties that are involved in an emergency response operation that is conducted in a remote or inaccessible area.

SUMMARY

The invention is a mobile emergency response platform for monitoring and conducting in-field administration and coordination of emergency response activities. The platform is based on an all-terrain vehicle of the type that can accommodate at least two persons and is driven by tracks such as tank tracks, at least six wheels, or a combination of both wheels and tracks. The all-terrain vehicle has the capability, without requiring in-field modification by an operator, of traversing multiple off-road surfaces that include, at minimum, each of sand, mud, snow, swampland, thickly wooded areas, ice, grasslands, man-made rubble and debris, surfaces having angles of about at least thirty degrees from horizontal, and the floatable operation of the vehicle on waterways. Thus, the vehicle can be driven directly from any one type of these terrains to any other type of these terrains without requiring alterations to the configuration of the vehicle.

The vehicle is equipped with a suite of electronic communication equipment that is capable of being moved with the platform across each off-road surface to a first remote location that is ideally in the vicinity of the emergency situation for optimal in-field command. The communication equipment is configured to have the capability of receiving, while being located at the first remote location, at least two types of wireless communication transmissions from one or more second remote locations, which are generally the positions of in-field response personnel, aircraft, or other remotely positioned command or information centers. While the platform is located at the first remote location, the platform is also capable of transmitting at least two types of wireless communication transmissions to each second remote location.

The electronic communication equipment has the additional capability, while the platform is located in the field at the first remote location, of performing a crossover operation in which an incoming signal of a first signal type is received, regenerated, possibly amplified, and relayed as a second signal type that is different from the first signal type. This crossover operation is two-way in that the electronic communication equipment can also receive an incoming signal of the second signal type and regenerate and relay the signal as a signal of the first signal type.

In-field environmental measurements are taken with an environmental monitoring station that is included and capable of being moved across the multiple off-road surfaces with the platform to the in-field first remote location. The environmental monitoring station is capable of taking in-field measurements of environmental conditions surrounding said platform, which are normally the environmental conditions of the area of the emergency. Most embodiments of the invention are configured to allow information about the in-field measurements taken by the environmental monitoring station to be transmitted to each second remote location in at least one of the first or second signal types.

Some embodiments of the invention include electronic positioning equipment as part of the platform on the all-terrain vehicle. The positioning equipment is capable of providing, at any given in-field first remote location, information about the position of the mobile platform. The electronic positioning equipment can use any one of a number of wireless technologies, having satellite, radio, mechanical, or hybrid-based position-measuring devices incorporated therein. The electronic communication equipment is often configured to also allow information about the position of the platform at a given first remote location to be transmitted directly to one or more second remote locations in at least one of the first or second signal types.

Those skilled in the art will realize that this invention is capable of embodiments which are different from those shown and that details of the structure of the mobile platform can be changed in various manners without departing from the scope of the invention. Accordingly, the drawings and descriptions are to be regarded as including such equivalent mobile platforms as do not depart from the spirit and scope of the invention.

BRIEF DESCRIPTION OF THE DRAWINGS

For a more complete understanding and appreciation of this invention and many of its advantages, reference should be made to the following, detailed description taken in conjunction with the accompanying drawings wherein.

DETAILED DESCRIPTION

Figure 1:
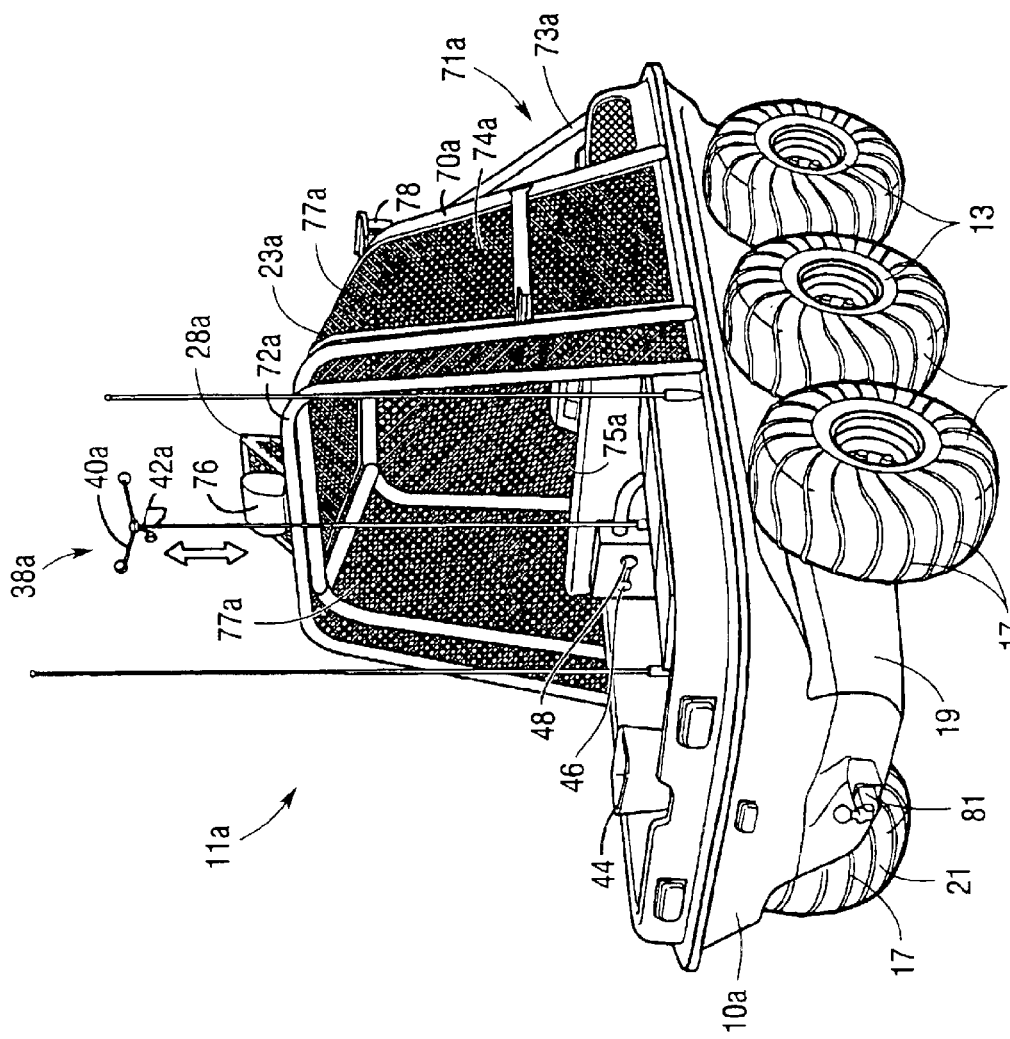
FIG. 1 is a rear perspective view of a mobile emergency response platform according to one embodiment of the invention.

Referring to the drawings, identical reference numerals are used to designate the same or corresponding parts throughout the several embodiments and figures shown and described. In some figures, some specific embodiment variations in corresponding parts are denoted with the addition of lower case letters to reference numerals.

Figure 4:
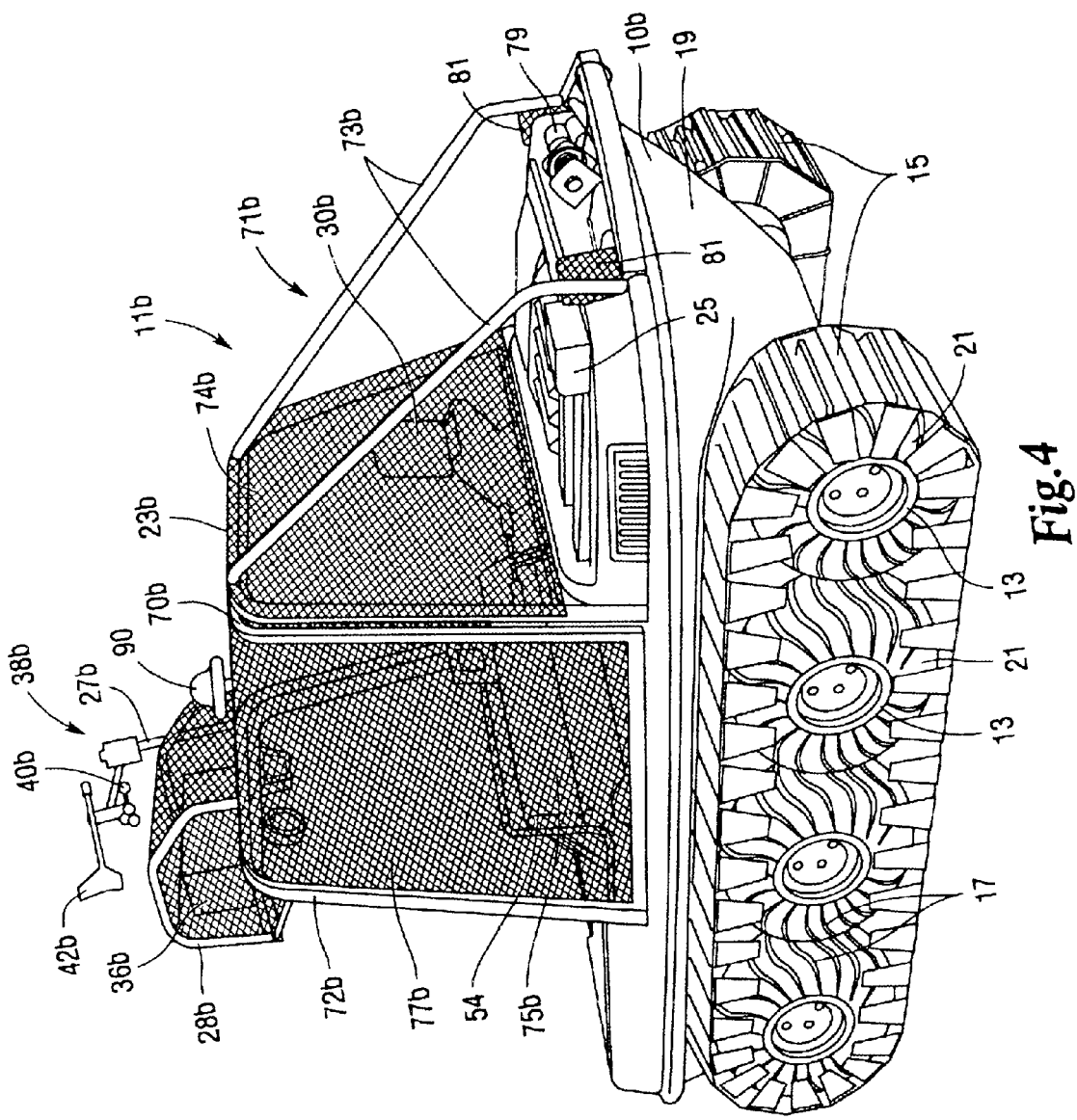
FIG. 4 is a front perspective view of a mobile emergency response platform according to one embodiment of the invention.

FIG. 1 depicts an all-terrain vehicle 10a that is the basis for an embodiment of a mobile platform 11a according to the invention. The all-terrain vehicle 10a is of the type having six, eight, or more wheels 13, with suitable vehicles including the Argo and Centaur All-Terrain Vehicles, both being available from Ontario Drive & Gear Limited of New Hamburg, Ontario, Canada, and the Max and Buffalo All-Terrain Vehicles, both being available from Recreatives Industries, Inc. of Buffalo, N.Y. Some embodiments may be outfitted with tracks or a combination of tracks and wheels or have additional features as described below. Tires 21 used on the vehicle are formed to provide traction on slippery ground. The wheels 13 are spaced substantially equidistant from each other in order to enhance traction and off-road operation. FIG. 4 depicts a platform 11b based on a similar vehicle 10b having tracks 15 that are positioned over wheels 13 to increase traction and reduce downward pressure of the vehicle 10b. The tracks 15 are usually removable to allow for the vehicle 10b to operate with wheels 13 alone. In construction, the tracks 15 can be comprised of metal, rubber, or a synthetic material. The tracks 15 can also be cleated to allow for optimal travel over snow and marsh areas.

Referring again to FIG. 1, the vehicle 10a is relatively lightweight, usually weighing no more than approximately 1100 to 3000 pounds and may exert a downward pressure of less than about three to four pounds per square inch when operated only with wheels 13 or less than about one pound per square inch when operated with tracks, such as the tracks 15 shown on the platform 11b in FIG. 4. Referring again to FIG. 1, the vehicle 10a typically includes a two or four-cycle gasoline, diesel, or alternative fuel engine of approximately 10 to 25 horsepower that achieves an hour or more of service per gallon of gasoline. The vehicle 10a is generally designed for low speed operation and is typically geared to travel no more than approximately 25 miles per hour. Each wheel 13 is chain driven to maximize power, especially at low speed.

Traction steering is often provided to allow the vehicle 10a to turn in an extremely tight radius that can be nearly within the length of the vehicle 10a. The traction steering is achieved through a drive system with one or more transmissions that controllably supply power to all of the wheels 13, or to a track, on one side of the vehicle 10a and separately, controllably provide power to all of the wheels, or to a track, on the other side of the vehicle 10a.

Figure 2:
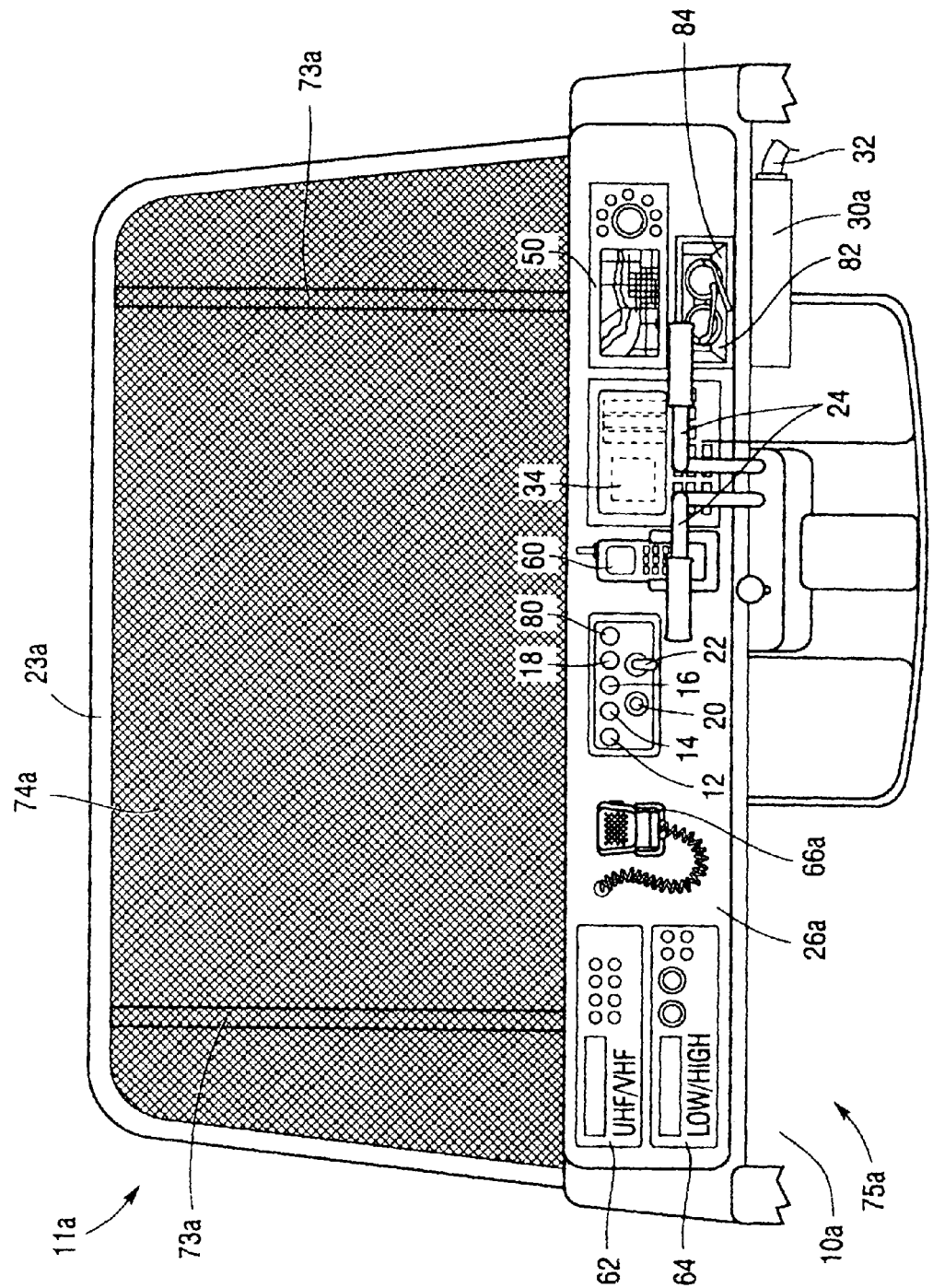
FIG. 2 is an operator's view of a vehicle dashboard of the platform of FIG. 1 depicting an example suite of wireless technologies according to one embodiment of the invention.

Referring briefly to FIG. 2, which depicts the vehicle dashboard 26a of the platform 11a of FIG. 1, the vehicle 10a includes basic instrumentation such as an oil gage 12, speedometer 14, choke 16, voltmeter 18, ignition switch 20, and headlight switch 22. Steering controls 24 allow an operator to selectively affect the speed to wheels or tracks on one side of the vehicle 10a to effect traction steering.

Referring again to FIG. 1, the all-terrain vehicle 10a has extremely versatile off-road capabilities, including the ability to enter into and climb steep inclines and drive through heavily wooded areas away from dirt roads or trails, and can clear brush and small trees as the vehicle 10a progresses. The vehicle 10a is capable of traversing most off-road terrains where automobiles, all-terrain trucks, or SUV-style vehicles cannot be driven. This includes thick swampland, mud, snow, sand, wooded areas having thick underbrush, ice, grasslands, man-made rubble and debris, uneven ground, inclined surfaces having angles of up to thirty degrees and greater, and floatable operation on water. The vehicle 10a is also capable of freely moving from one terrain to another without modification. This includes the ability to move directly from land to water without requiring in-field modification by an operator. When equipped with tracks, the vehicle 10a has enhanced off-road capabilities and generally exhibits a smoother ride for its operators and passengers.

The vehicle 10a is also capable of floatably operating on waterways regardless of whether the vehicle is equipped with wheels and/or tracks. When operating only with wheels 13, tread ribs 17 on each tire 21 act as oars to propel the vehicle 10a forward across the water. Referring briefly to FIG. 4, tracks 15 can also provide similar forward propulsion on water by being run in reverse.

Floatation capabilities are provided by a lightweight body 19 that may be constructed of a high-density polyethylene or comparable material to further reduce weight. The construction of the body 19 encloses all mechanical components except for the wheels 13, tires 21, and tracks 15 and seals against water intrusion to critical engine and transmission parts. The body 19 also provides shielding for most mechanical components from water, mud, sand, rocks, or other objects that the vehicle contacts along the ground or in waterways. In addition to floatation, this shielding also contributes to the capabilities of the vehicle 10a for traversing difficult terrain and penetrating areas where truck-style vehicles, SUVs and bike-style vehicle cannot operate.

Like the hull of a boat, the body 19 is contoured in shape near the front of the vehicle to optimize on-water handling. As best understood with a comparison of FIGS. 1 and 4, further stability is provided by a symmetrical, generally downwardly tapered cross sectional shape along the length of the body 19.

Referring again to FIG. 1, while the vehicle 10a is afloat, the wheels 13 and tires 21 are capable of propelling the vehicle 10a at speeds of up to about four miles per hour. An optional small marine engine (not shown) can be attached to the rear of the vehicle 10a to allow for slightly higher speed propulsion. The outboard engine can then be removed and stowed within the vehicle 10a when the platform 11a is on land or not in use. However, the outboard engine is not necessary for floatable operation. In many circumstances, water propulsion using the tread ribs 17 of the tires 21 alone may be preferred since the in-field modification of mounting the outboard engine can require an additional amount of time that is not available in an emergency situation. Therefore, in order to permit direct movement from land to water and multiple terrains types, all mechanical components other than wheels, tires and tracks, and the optional outboard marine engine, are carried either internally or on top of the platform 11a.

The platform is also equipped to protect the passengers from rollovers and external objects. For example, when penetrating thickly wooded areas that include thick underbrush, branches and tall brush, these obstacles are cleared from the path of operators and passengers riding in the vehicle.

FIG. 1 depicts a cage 23a mounted over the vehicle passenger area 75a of the platform 11a for protecting passengers from brush and other obstacles. The cage 23a includes a frame 70a, roll bar 72a, brush guard 71a, and a protective mesh screen 74a. The roll bar 72a is constructed of a heavy gauge material to protect passengers in the event that the vehicle 10a rolls over. The brush guard 71a comprises multiple brush clearing bars 73a that are slanted at an angle to extend from about the front of the vehicle 10a to the top front area of the frame 70a. Brief reference to FIG. 4 allows a better understanding of the orientation of such clearing bars 73b with respect to the platform 11b and the other members of the cage 23a. During use, the slanted orientation of the brush clearing bars 73b permits larger branches and other obstacles to be deflected away from passengers.

Referring again to the platform 11a of FIG. 1, the mesh screen 74a, which extends across the front and at least partially along the sides of the passenger area 75a, serves to deflect smaller branches and loose external obstacles such as rocks and leaves away from the passengers. The mesh screen 74a is typically has a steel mesh or expanded metal construction that is sufficient to prevent snapping branches and other debris from coming into contact with a passenger from a head-on or lateral direction. One or more doors 77a may extend along either side of the cage 23a to facilitate entry and exit of passengers from the passenger area 75a. The doors 77a typically swing open and can be removed when the vehicle 10a is to be operated in an obstacle-free environment.

The mesh and frame construction of the cage 23a is usually sufficient to provide each passenger with a relatively unobstructed 360-degree perimeter view around the vehicle 10a, which can be invaluable for remote navigation or search and rescue uses of the platform 11a. The heavy gauge material of the cage 23a can also be steel or another metallic substance that allows the cage 23a to function as an amplifying antenna to improve the transmission and reception of radio signals by the wireless network technologies of the platform 11a.

FIG. 4 depicts a number of externally mounted utility devices that can be used to facilitate the in-field command and coordination emergency situations. A public address system 25 is mounted near the front of the vehicle 10b, and, with brief reference to the view of the dashboard 26b depicted in FIG. 5, can be operated by an operator in the passenger area 75b of platform Ha using a microphone 66b. The operator can use the public address system 25 to orally relate high-volume instructions to individuals that are located near the platform 11a. The public address system 25 is of a heavy-duty type well known in the art and is generally capable of withstanding collisions with small objects. Suitable public address systems include the TK-790HBK 9BHSH1 VHS High-band Repeating System available from Kenwood interconnected to the Slim Line Speaker, Model SL100\SL100CV (100 Watt) with bumper mount available from Code3, Inc. of St. Louis, Mo. The TK-790HBK 9BHSH1 VHS High-band Repeating System can also be used with the Scorpion 3930 PA System, also available from Code3, Inc. Some embodiments may allow for the megaphone 25 to be integrated into other wireless technologies of the platform 11b and may allow for remote operation. Referring again to FIG. 4, the brush clearing guards 73b are positioned to protect the megaphone 25 from collisions with larger objects, such as large branches and small tree trunks, from a head-on collision.

FIG. 4, also depicts an electric winch mounted 79 at about the center front of the vehicle 10b. The winch 79 is of a type well know in the art to have a capacity of about at least 1,000 to 4,000 lbs. Suitable electric winches include the Superwinch ATV 300 available from Superwinch, Inc., having a capacity of approximately 3000 lbs., and the Power Winch Kit (for Argo) available from Ontario Drive & Gear Limited, having a capacity of approximately 2500 lbs. The winch 79 is generally capable of pulling both personnel and heavy objects from inaccessible locations such as ditches or steep inclines. The winch 79 is also generally capable of pulling the platform 11b itself from such locations by securing a cable to a fixed and stable position. The cable will usually include a hook or other suitable attachment for connecting to objects such as chains, stretchers, and cleats.

Additional tools may also be included on the platform to perform heavy dragging or pulling operations. As best understood with from FIG. 1, a hitch 81 may also be attached to the rear of the vehicle 10a to allow for the dragging of a trailer or utility cart. Such trailers may themselves be buoyant to allow for amphibious towing. Some embodiments may allow for additional electronic equipment to be carried in such trailers.

The vehicle 10b also includes cage-enclosed headlights 81 that are capable of withstanding the impact of small object and debris. The cage-enclosed headlights 81 are located sufficiently behind the brush clearing guards 73 of the platform 11a so as to be protected from collisions with larger objects such as branches and small tree trunks.

Similar cages and protective covers can also be included to protect other equipment of the platform 11b. An auxiliary protector 28b can be added to the cage 23b to extend protection to one or more fixed components 36b of an environmental monitoring station 38b. Referring briefly to FIG. 1, a partial auxiliary protector 28a can also be used to protect components requiring protection from one or more particular directions. For example, a search light 76 can be a valuable tool for night time driving or for conducting search operations in thickly wooded areas, and is generally controlled from within the vehicle 10a. The lens and lamp of the search light 76 may be particularly susceptible to damage from debris coming from a head-on or slightly angled direction. The partial auxiliary protector 28a specifically provides protection from branches and debris coming from these directions without adding additional unnecessary weight and cost to the platform 11a. A caged strobe light 78 can also be mounted directly to the frame 70a or to the brush guard 71a of the cage 23a.

In FIG. 4, the fixed components 36b of the environmental monitoring station 38b may require a greater degree of protection than a search light 76. The environmental monitoring station 38b typically includes a variety of instruments for taking different types of environmental measurements. Examples of such instruments include but are not limited to anemometers and wind vanes, instruments that measure temperature, relative humidity and barometric factors, radiation detectors/Geiger counters, chemical or biological agent sensors, remote heat sensing equipment, and any other device capable of measuring a pertinent environmental condition that is in the vicinity of the platform 1b. Additional examples are devices capable of measuring dew point, wind chill, heat index, rainfall, wind gusts, cloud base height, and air density.

Devices that provide weather station capabilities are well known in the art, such as the WS-2000 wireless weather station by The Science Company, Inc. There is also the IRDAM 4056 by IRDAM, SA., which is a solid state device having no moving parts but which measures wind speed and direction, air temperature, and barometric pressure but not relative humidity or rainfall. It does not calculate dew point or wind chill. However, these data would be easily derivable from the wind speed, relative humidity and temperature, and rainfall collection and measurement would be a relatively simple matter to add.

Instruments that can function from inside the auxiliary protector 28b of the cage 23b, such as radiation detectors/Geiger counters, chemical or biological agent sensors, and temperature, relative humidity and barometric measuring devices, may be installed as one or more of the fixed components 36b that are positioned within the auxiliary protector 28b. However, an internally mounted installation could potentially interfere with the operation of an instrument requiring unobstructed exposure to environmental conditions, even if the environmental separation were only through mesh or an expanded metal cage. For example, an anemometer or wind vane would normally require a positioning that would minimize obstructions posed by other components of the platform 11b, though it is possible that an external mounting of such instruments could make them susceptible to damage from contact with external objects.

Thus, it may be necessary to provide for temporary external mountings of such instruments. FIG. 4 depicts an environmental monitoring station 38b having an anemometer 40b and wind vane 42b mounted on the cage 23a of the platform 11a with a detachable stand 27b. When mounted to the cage 23a in this manner, the detachable stand 27b allows the anemometer 40b and wind vane 42b to remain in an extended but fixed position with respect to the rest of the platform 11b. This positioning tends to minimize interference that other components of the platform 11b may have on relative airflow passing the anemometer 40b and wind vane 42b. The detachable stand 27b is configured for quick and easy mounting and removal from the cage 23a. In use, the stand 27b, anemometer 40b and wind vane 42b are usually only mounted when the vehicle 10b is in the field and the platform 11b is in a stationary position. The stand 27b is normally disconnected from the cage 23a and stowed with the anemometer 40b and wind vane 42b within the vehicle 10b when the vehicle 10b is being driven or when the platform 11b is not in use. This prevents damage to the anemometer 40b or wind vane 42b from contact with obstacles or debris.

FIG. 1 depicts a possible variation on the configuration of the environmental monitoring station 38a in which a detachable stand 27a is mounted directly to the vehicle 10a behind the vehicle passenger area 75a, the stand 27a extending to a sufficiently vertical position that the attached anemometer 40a and wind vane 42a remain at a mounted position above and behind the cage 23a. The detachable stand 27a is also configured for quick and easy mounting and removal and is normally taken down with the anemometer 40a and wind vane 42a to be stowed either on or within the vehicle 10a when the vehicle 10a is being driven or when the platform 11b is not in use. Other components of the environmental monitoring station 38a mounted behind the vehicle passenger area 75a include a rainwater collection bucket 44, wet bulb thermometer 46, and barometer 48.

FIG. 2 depicts an operator's view of the vehicle dashboard 26a of the platform 11a of FIG. 1, having an example suite of wireless technologies. The environmental monitoring station 38a, depicted in FIG. 1, is configured so that measurements taken by included instruments can be manually or automatically recorded and transmitted to by other devices such as a microprocessor 30a of FIG. 2 or a satellite communication device. Both the microprocessor 30a and, if included, a satellite communication device can be connected to various instruments of the environmental monitoring station 38a of FIG. 1 via a cable 32 so that the output of each instrument can be converted from an electrical signal to a digital or analog signal to be stored and/or visually presented on a dashboard weather display 34. The weather display 34 can include plotting or other data processing facilities and may be incorporated into the microprocessor 30a or be a separate piece of hardware.

The wireless technologies of the platform include electronic communication equipment having the capabilities of being moved across each of the multiple types of off-road surfaces that the platform is capable of traversing. The communication equipment includes no fewer than a combined total of two signal transmitters and two signal receivers, though one device often acts as both a receiver and transmitter of at least one type of signal. However, frequently, the platform will utilize a significantly greater number of transmitters and/or receivers. The platform preferably includes one or more wireless radio transmitters and/or receivers. These radio units are generally configured to operate over several bands and, in order to achieve repetition of systems, it is preferred that at least two separate radio units be incorporated into the platform. A two-way satellite uplink can also be provided in some embodiments, as can optical or visual signal equipment.

Communications equipment depicted on the dashboard 26a of FIG. 1 includes a mobile telephone 60, a transceiver UHF/VHF radio 62, and a transceiver high band/low band radio 64. A microphone 66a is often mounted on the dashboard 26a and configured for use with each of the radios. Suitable mobile telephones, such as cellular and satellite types, are well known in the art and which are available from manufacturers such as Motorola, Qualcomm, and Nokia. Mobile telephones can provide voice communications or, in some embodiments, be used with the microprocessor to provide an additional mode of data communication with remote locations or with the Internet. The radios can also provide voice communications and be used with the microprocessor to provide a mode of data communication with remote locations. One suitable mobile radio is the VX-3000 Mobile available from Land Mobile, a transceiver designed for commercial applications which includes low band, UHF, and VHF and HAM. Various other suitable models are available from manufacturers such as Ericsson/GE, Bendix/King, Vertex, Tait, Maxon, and Mod-U-Con. Other types of radios can also be implemented into the platform 11a.

Additional wireless technologies can include electronic positioning equipment that is capable of providing information about the position of the mobile platform 11a at a given location. In FIG. 2, the platform 11a is equipped with a global positioning system (GPS) 50, of the type that is commonly known in the art, which acts as a receiver of satellite signals for the electronic computation of position of the platform 11a. Although the platform 11a is shown and described in FIG. 2 as using a GPS 50, it will be appreciated that other types of electronic positioning devices, including loran, radar, sonar, and other wireless systems can also be used and are contemplated to be within the scope of the invention. The GPS 50 or other positioning system may be equipped with a direct data feed to enable coordinate locations or other data to be directly fed into the computer 30a, the system of the cellular telephone 60, or the transceiver radios 62 and/or 64 for transmission to a remote location.

Radar, sonar, infrared/thermal imaging and other types of remote sensing systems can also be implemented for both environmental and object sensing. For example, appropriate radar systems can be implemented that allow for weather forecasting and that allow for use in conjunction with other instruments of the weather station. The compilation and processing of data can then be performed with the computer or be passed to a remote location via present wireless technologies. Ground or forest penetrating radar, sonar, and infrared systems can also be used to detect the presence of subterranean objects such as tunnels and land mines and be used for the remote detection of trapped or lost individuals. Suitable ground penetrating radar systems for these purposes include the TerraSIRch SIR-3000 from Geophysical Survey Systems, Inc. (GSSI). Suitable thermal imaging surveillance equipment include the ThermoVision Ranger™ Long Range Surveillance System available from FLIR Systems.

The dashboard 26a, shown in FIG. 2, can also include visual enhancement equipment such as night vision, infrared devices 82, or thermal imaging devices which can be mounted or stowed in a dashboard compartment 84 and which can be used by an operator to see at night. The output of the infrared devices 82 or thermal imaging deices may also be displayed on the dashboard 26a in a small monitor or be configured as goggles worn by one or more of the operators. In the former case, visual image data may be capable of being passed through the microcomputer 30a or directly to other electronic communications equipment for transmission to a remote location. In the later case, the infrared devices 82 may be capable of being worn by one of the operators when that operator walks away from the platform 11a. Suitable worn night vision devices include the VIPER available from Smart Tech and the ANVIS Dual Generation 3 night vision goggles from Sierra Pacific Infrared. A suitable camera-based system is the IR PRO infrared video camera that is available from Sierra Pacific Infrared.

Digital images may also be recorded, transmitted, and received using a unitary camera and radio transceiver (not shown). In one preferred embodiment, images recorded or received by the radio would also be viewable via a small color monitor on the dashboard 26a and capable of being passed to other devices such as the microprocessor 30a or UHF/VHF and low band/high band radios 62 and 64, or if present, satellite communication equipment, for manipulation by the operator and transmission to remote locations. An example of a suitable unitary camera and radio transceiver would be the VC-H1 Portable Transceiver available from Kenwood.

One or more relay devices are also included among the electronic communication equipment of the platform to allow for the administration, command, and coordination of individuals or sub-units in the field. The relay devices are most often radio-based transceiver repeaters and allow for the receipt and transmission of voice signals from personnel in the field, who are separated by some distance from the platform, to a central remote location. However, the relay devices can also be used to receive and transmit other types of signals, such as environmental data, medical measurements, electronic instructions, or position data between remote personnel and a central location. In some embodiments or situations, the relay devices can also be used to receive and transmit information between separated field personnel or other vehicles or central locations. If necessary, other wireless technologies, such as a radio or wireless Internet, can also be included among the electronic communication equipment and be configured to perform this relay function.

The rely capabilities of the platform include a crossover ability to receive at least one type of signal that can be regenerated and relayed in at least one different type of signal format. For example, a single radio receiver/transmitter unit can be incorporated that allows for the receipt of a radio signal in a first bandwidth and subsequent amplified (boosted) transmission of the signal in a second bandwidth that is different from the first. Signals received in the second bandwidth can subsequently be re-transmitted in the first bandwidth, allowing the platform to act as a crossover relay for multiple in-field parties having different or incompatible means of communication. Frequently, the other platform will be configured to allow for crossover communication across a large number of radio bandwidths and/or between multiple types of devices, such as between mobile telephones, radio transceivers, wireless Internet networks, satellite communication systems, and between other wireless communication formats.

Suitable repeater transceiver devices are well known in the art. A particular repeater transceiver is selected for a particular emergency response platform according to the particular requirements of a frequency ranges in use by emergency response parties and emergency command centers. Suitable repeaters for possible inclusion in the platform of the invention include the TK-690H/790(H)/890(H) radio and repeater units that are available from Kenwood Corporation, each having frequency ranges that vary between about 29.7 MHz and 480 MHz. Other suitable units include the 800 MHz and 900 MHz repeater transceiver units also available from Kenwood Corporation, having ranges varying from about 806 MHz to 940 MHz. The TRP-1000 and ACU-1000 System, available from JPS Communications, Inc., is another suitable crossover frequency repeater that includes two cases that together hold up to ten UHF and VHF radios.

Repeating of video signals is also possible by using an appropriate streaming video system such as the TH-1 "Talking Head" Codec for ISDN & Inmarsat, available from 7E Communications, Ltd. The TH-1 includes a video camera system to allow for image data to be recorded by a platform operator or by remote control and further allows for transmissions to occur via satellite. The TH-1 can be implemented with software that allows for manipulation of image data by an operator using a microprocessor of the platform.

Figure 5:
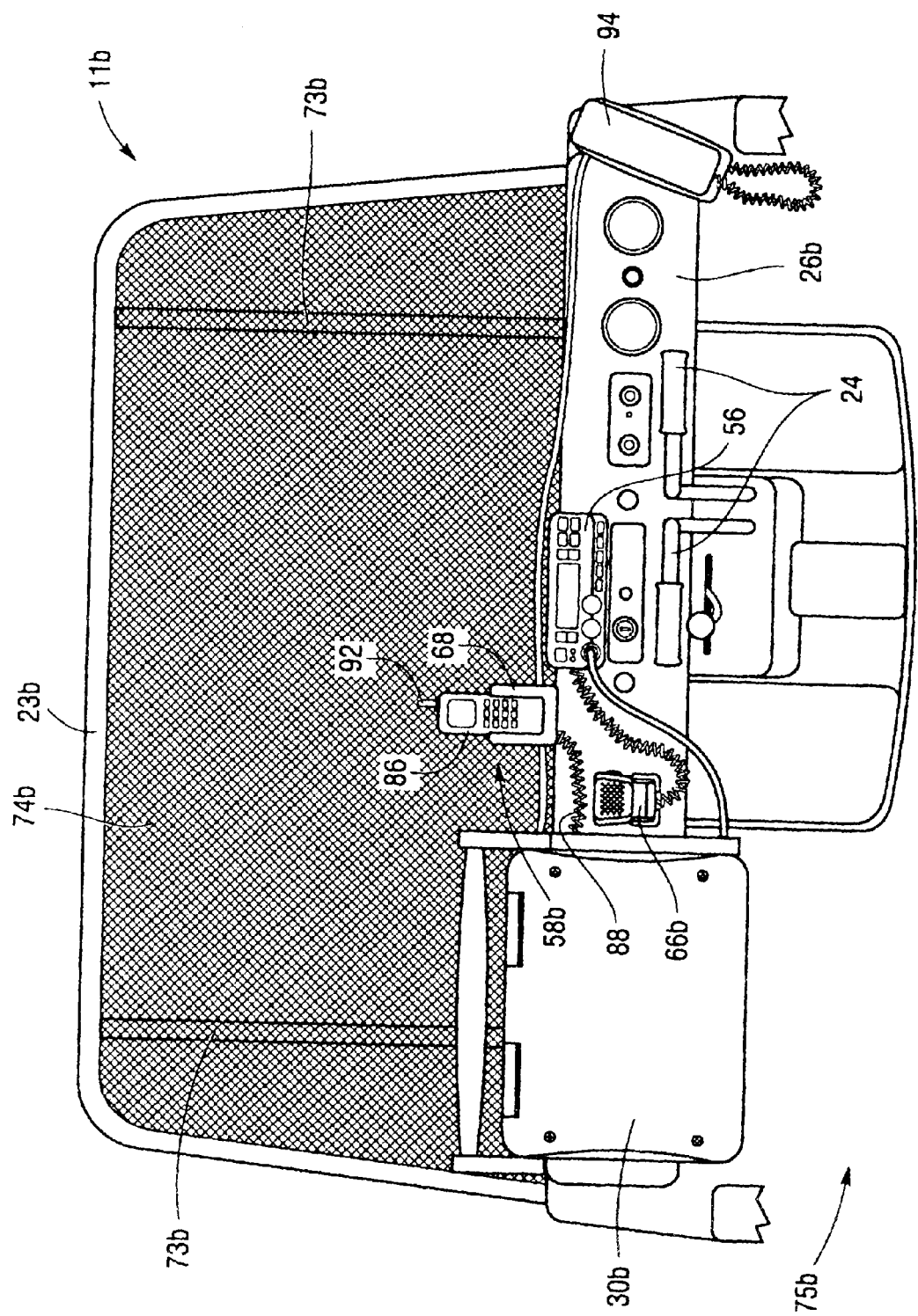
FIG. 5 is an operator's view of a vehicle dashboard of the platform of FIG. 4 depicting an example suite of wireless technologies according to one embodiment of the invention.
Figure 6:
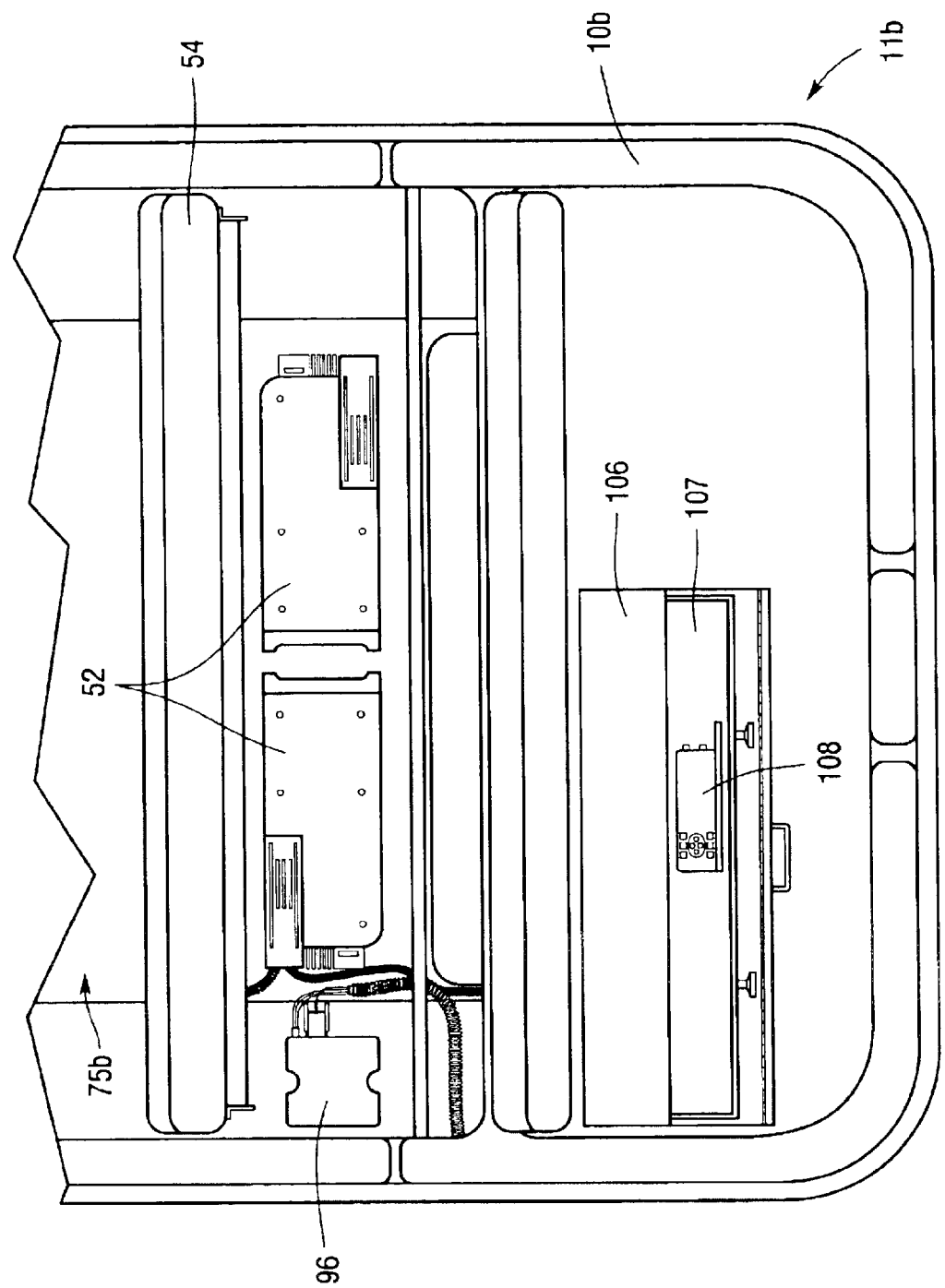
FIG. 6 is a top view of the rear portion of the platform of FIG. 4 having the seat of the passenger area lifted to reveal concealed electronic communications equipment.

Repeater transceivers can be implemented in various configurations on a platform. FIG. 5 depicts an operator's view of a vehicle dashboard 26b of the platform 11b of FIG. 4 having an example suite of wireless technologies. FIG. 6 is a top view of the rear portion of the same platform 11b of FIG. 4 having the bench seat 54 of the vehicle passenger area 75b lifted to reveal the boxes of repeater transceivers 52. The repeater transceivers 52 are interfaced to a laptop-style microprocessor 30b mounted on the vehicle dashboard 26b shown in FIG. 5. FIG. 6 also depicts an optional tool box 106 mounted directly behind the vehicle passenger area 75b and bench seat 54 for storing additional equipment in pull out drawers 107. Such equipment can include additional repetitive devices such as an additional hand held global positioning unit 108.

Referring again to FIG. 4, the laptop-style microprocessor 30b is positioned to allow for in-field operation from the vehicle passenger area 75b and usually contains interfaces to allow the microprocessor 30b to be used to control, manipulate, and transfer data between the various electronic communication equipment. The microprocessor 30b itself is waterproof and is capable of withstanding shocks and functioning in extreme environmental conditions. These attributes allow the microprocessor 30b to function without damage or lock up as the platform 11b traverses difficult terrain.

Data contained in the microprocessor 30b can be recorded, received, transmitted, or relayed between the platform 11b and remote locations through other wireless communication systems that are also included on the platform 11b. The microprocessor 30b can also incorporate wireless Internet capabilities to allow for the transmission and receipt of data from remote locations. The wireless Internet capability may also utilize one or more of the other transmitters or receivers that are incorporated into the platform 11b or, in some embodiments, may allow the microprocessor 30b to operate partially or fully independently of other communication equipment.

One suitable microprocessor is the GoBookMAX laptop computer available from the Itronix Corporation of Spokane, Wash. The software resident on the microprocessor 30b is usually specifically configured to function as or to work with computer integration software that allows for upwards of 50 different parameter readings from measuring devices such as those of the weather station 38b or, if present, from positioning equipment of the platform 11b. Emergency reference software may also be provided, such as the COBRA Emergency Response Software Package available from Defense Group, Inc. (DGI). Additional loaded software on the microprocessor 30b may include that which is loaded to allow for manipulation of image data gathered by a streaming video system such as the TH-1, when present on the platform 11b. The microprocessor 30b can be equipped with built-in or auxiliary positioning equipment, which may be used in conjunction with topographic software loaded in the microprocessor 30b. An example of such a configuration would be the installation of topographical mapping software such as Topo USA 4.0 (aerial data packet), used in conjunction with an Earthmate™ GPS, both available from the DeLorme Company of Yarmouth, Me.

The microprocessor 30b is directly interfaced to a multi-band radio 56 (FIG. 5) and the repeater transceivers 52 (FIG. 6) that are designed to work with the multi-band radio 56. The combined multi-band radio 56 and repeater transceivers 52 are sufficient to allow for long range broadcasting, repeating, and signal crossover. Programming of selected frequencies for signal crossover can be performed in-field by an operator via the microprocessor 30b. This programming can be modified by operators in-field as required by circumstances of a particular emergency situation.

During use at a first remote location in the vicinity of an emergency situation, the repeater transceivers 52 allow for the reception of an incoming signal of a first signal type, for example, a radio signal having any one particular frequency that is programmed by the microprocessor 30b for repeating. When the incoming signal is received from an in-field emergency response team using a hand held radio, the signal may be relatively weak due to the normal limitations of the response team's smaller broadcasting radio.

For example, personal, hand held radio units have frequently been configured to run at 5 watts, giving the units an approximate broadcasting range of 2 miles. While it will be appreciated that actual ranges and equipment specifications will depend on particular equipment, environmental circumstances, and current states of technology, a typical incoming signal of this first signal type could be received and then be regenerated and the signal strength amplified to the approximate scale of 100 watts or more and then be relayed by the repeater transceivers 52 of the platform 11b as one or more second signal types (eg different frequencies and/or different types of carrier modulations and bands ranges). Each second signal type would normally be selected by the operator, who would, using the microprocessor 30b, program the repeater transceivers 52 to receive and re-broadcast transmissions of the second signal type. As a result, transmissions of one or more of the second signal types would also be receivable and be automatically regenerated and relayed as the first signal type. Thus, the platform 11b would provide crossover broadcasting that would allow different in-field response units with different types of radios to communicate with each other. In addition, operators of the platform 11b would themselves be able to communicate with different in-field response units or with a remote centralized command center using the microphone 66b (FIG. 5) of their own multi-band radio 56 via the transceiver repeaters 52. If the platform 11b were to be located in the vicinity of a phone line connection, conventional telephone communications could also be run through the transceiver repeaters 52.

The crossover and repeating operations of the platform 11b would also permit various in-field response parties to significantly increase the effective range of their communications. For example, a fixed position command center such as a building, a trailer command center, or a command aircraft would characteristically have radio equipment broadcasting at a level on the order of 100 watts, allowing an effective communications range of many tens of miles or more. Although personal communication devices may be able to receive broadcasts from such command centers, they would normally be unable to transmit reply broadcasts due to their limited broadcasting strength. However, the placement of the mobile platform 11b in the vicinity of the emergency situation would allow for lower power broadcasts from in-field response units to be re-broadcast or repeated at higher powers. For example, referring to FIG. 6, if the repeater transceivers 52 of the mobile platform 11b are TK-690H/790(H)/890(H) radio and repeater units as described above, the platform 11b will allow effective broadcasting range to be increased to 30 to 40 miles or more for selected frequency ranges. However, exact numerical ranges are intended to be illustrative only and would depend on specific equipment, circumstances, and current states of technology.

Referring now to FIG. 5, even longer range communications are possible with the use of a satellite and/or cellular communications system 58b, which allows for signals to be relayed from the platform 11b for transmission by a satellite to a remote location. The satellite communication system 58b is self-contained in a handset 86 that can be removably inserted in a cradle 68 mounted on the dashboard 26b of the vehicle 10b. The satellite communication system 58b is further configured to interface with the microprocessor 30b via a sat-com cord 88 when the handset 86 is inserted in the cradle 68, the interface allowing for all data transfer and radio-based transmissions to be routed through the satellite communication system 58b rather than through the multi-band radio 56 and repeater transceivers 52. When mounted in the cradle, the handset 86 allows for the transmission and reception of satellite signals to be made through an auxiliary antenna 90, shown mounted to the top of the cage 23b in FIG. 4. As a satellite uplink, the satellite communication system 58b allows data and voice and/or visual transmissions to be relayed hundreds or thousands of miles away from the vicinity of the emergency situation. The satellite communication system 58b may also have a repetitive, built-in global positioning system.

Due to the self-contained configuration of the handset 86 and the presence of a built-in antenna 92, the satellite communication system 58b can also be removed from the cradle 68 by an operator and be carried away from the platform 11b. The handset 86 retains all functions of the satellite communication system 58b except for the ability to interface with the platform 11b. However, while removed from the cradle 68, the handset 86 can continue to be used as a conventional mobile telephone. While the handset 86 is absent from the cradle 68, all voice/visual and data transmissions and receptions can continue to be passed through the multi-band radio 56 and transceiver repeaters 52 (FIG. 6).

When the handset 86 is returned to the cradle 68, as shown in FIG. 5, the interface between the satellite communication system 58b and microcomputer 30b is restored, allowing satellite voice/visual and data transmissions from the platform 11b to resume. A private line telephone 94 continues to allow the satellite communication system 58b to function as a conventional mobile telephone. Referring briefly to FIG. 6, a connection box 96 connects the private line telephone 94 to the cradle 68 of FIG. 5, allowing passengers to use the mobile telephone capabilities of the satellite communication system 58b without removing the handset 86 from the cradle 68 and interfering with the satellite communications interface between the handset 86 and microprocessor 30b. The connection box 96 also includes a power inverter having standard 12V DC and 110V AC power outlets to allow for the connection and powering of additional electrical devices.

Figure 7:
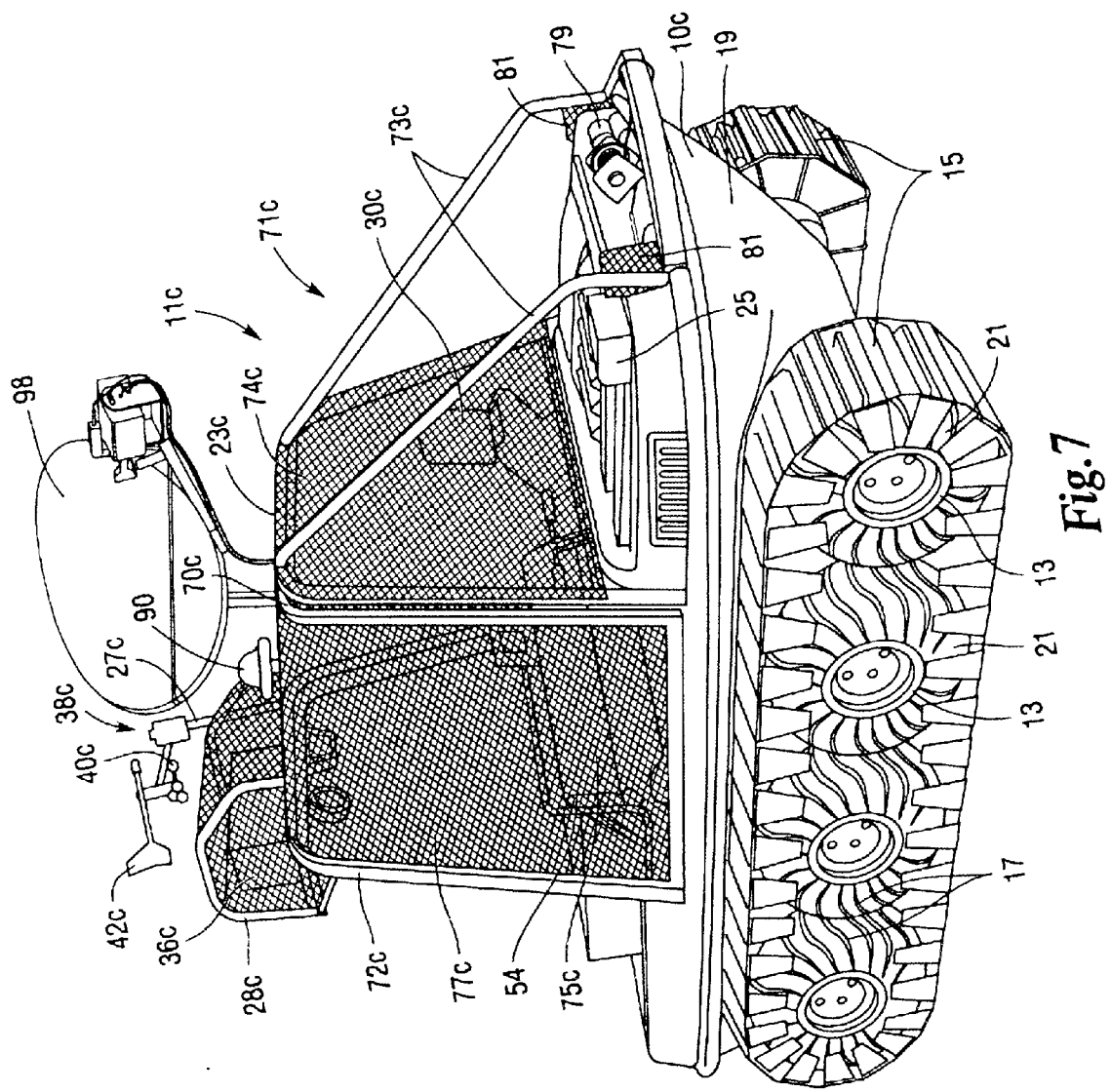
FIG. 7 is a front perspective view of a mobile emergency response platform according to one embodiment of the invention.

Suitable satellite communications systems include the Globalstar Mobile Satellite Phone and Car Kit available from Qualcomm, Inc. of San Diego, Calif. Dish-based satellite communication systems, including satellite internet systems, can also be integrated into the platform, and in some embodiments be used in conjunction with other satellite systems. FIG. 7 depicts a platform 11c according to one embodiment of the invention having a mounted dish antenna 98 allowing for high-altitude satellite Internet communications. The mounted dish antenna 98 is used in conjunction with the satellite communication system depicted in FIGS. 4, 5 and 6 and is mounted on the cage 23c adjacent the auxiliary antenna 90. The mounted dish antenna 98 may be removable to prevent damage as the vehicle 10c of the platform 11c is driven across difficult terrain. Such suitable dish-based satellite communication systems include the Mobile Satellite Unit available from SatCom Solutions.

Figure 8:
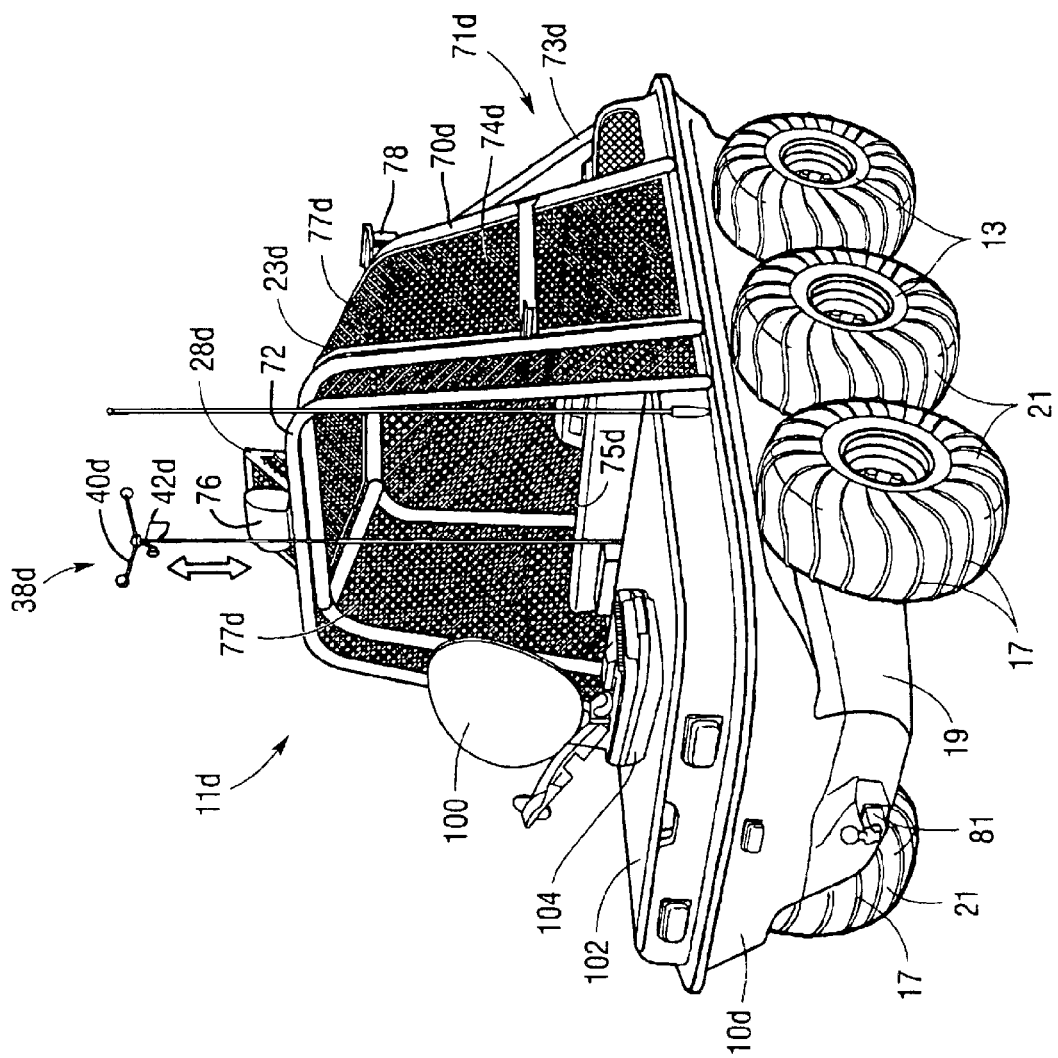
FIG. 8 is a rear perspective view of a mobile emergency response platform according to one embodiment of the invention.

FIG. 8 depicts a platform 11d according to one embodiment of the invention having a folding stand-alone dish antenna system 100 positioned on a flatbed 102 that is located behind the cage 23d of the platform 11d. The antenna system 100 is capable of collapsing into its case stand 104 for storage during transport. When in use, the antenna system 100 is interfaced to a microprocessor within the platform 11d and is capable of self-directing its orientation toward to a satellite for uplinking. Suitable stand-alone dish antenna 100 systems include the IPT Suitcase and Fly-Away Systems, both available from SWE-DISH Satellite Systems of Stockholm, Sweden.

Figure 3:
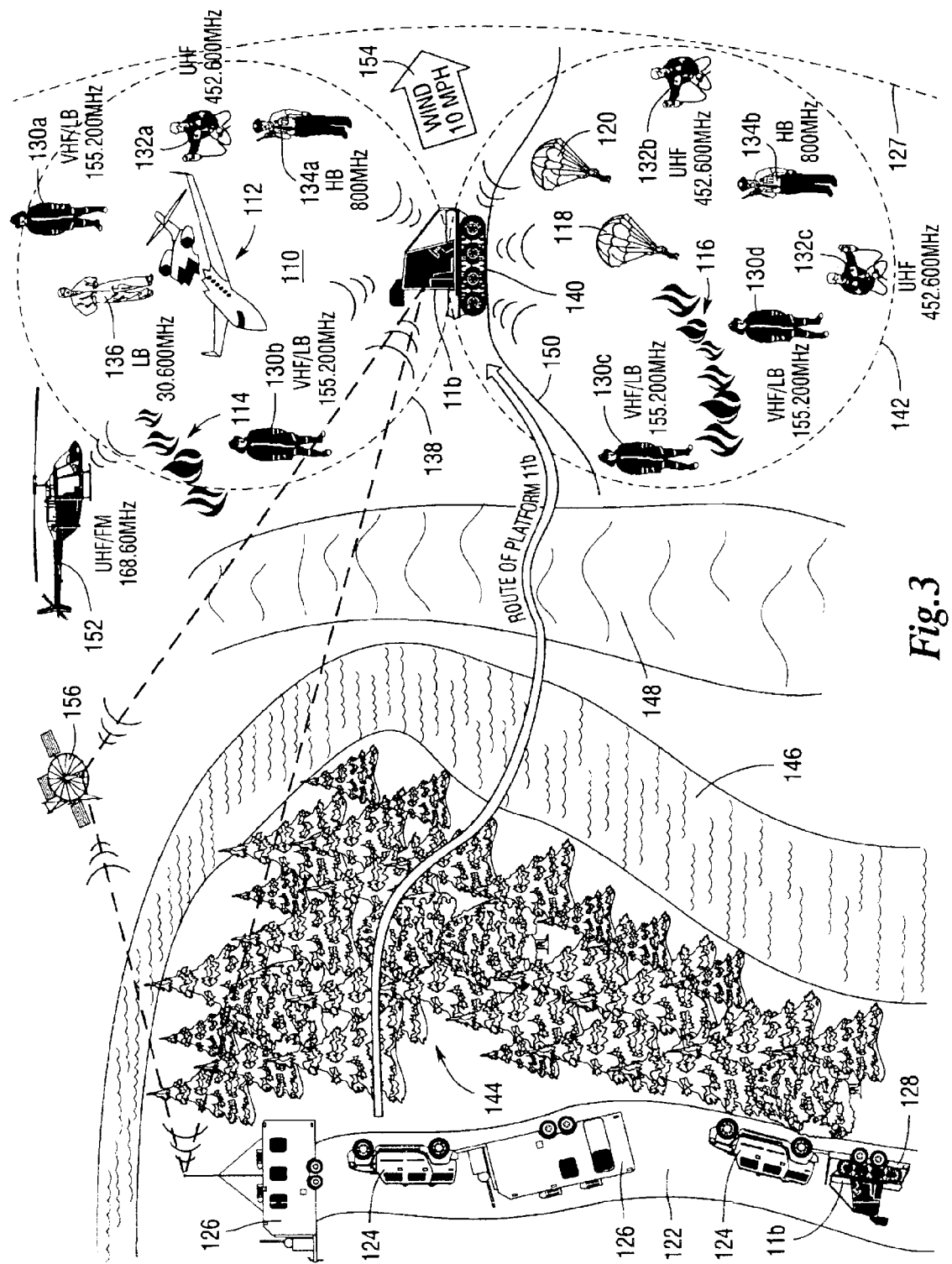
FIG. 3 is a topographic diagram depicting an example emergency situation in which a platform of the invention is utilized to administer, coordinate and command the activities of multiple in-field emergency response personnel.

The advantages of the invention become apparent in the following hypothetical scenario emergency situation depicted in FIG. 3. Consider an airplane traveling with six passengers, including a pilot, over a relatively inaccessible area 110. The airplane begins to have structural and mechanical problems and begins a downward descent. Before the plane crashes at a crash site 112, the pilot radios his position and indicates that at least one of the passengers has parachuted from the airplane. It is known that the pilot himself was unable to parachute from the plane prior to the crash. It is further known that the airplane lost considerable amounts of fuel prior to crashing, causing a first ground fire 114 in the vicinity of the crash site 112 and a second ground fire 116 near the positions 118 and 120 where passengers landed in parachutes.

The crash site 112, fires 114 and 116, and parachute landing sites 118 and 120 are all located many miles from the nearest dirt path 122. There are no other roads or foot pathways in the area 110. Truck or SUV-style conventional ATVs 124 are dispatched to the area with emergency response parties, each conventional ATV 124 pulling an off-road trailer with emergency response equipment. One ATV 124 pulls a trailer-based command center 126 equipped with high-power communication equipment, administration and medical facilities. The second ATV 124 pulls an off-road flatbed trailer 128 loaded with an emergency response platform 11*b* of FIG. 4. The dirt path 122 is the closest location to the crash site 112, parachute landing sites 118 and 120, and fires 112 and 116 that the conventional ATVs 124 and off-road trailers 126 can reach, and thus becomes the point of origin for the platform 11*b*. The trailer-based command center 126 is set up at the end of the dirt path 120.

Emergency response parties are airlifted to locations that are in the vicinity of the crash site 112, parachute landing sites 118 and 120, and fires 112 and 116. Among the parties dispatched are firefighting rescuers 130*a*–*d*, paramedics 132*a*–*c*, law enforcement 134*a*–*b*, and FAA officials 136. Each type of emergency response party is operating on foot and carries at least one hand held transceiver radio. However, the radios of the firefighting rescuers 130*a*–*d* transceive at a frequency of VHF/LB 155.200 MHz, the radios of the paramedics 132*a*–*c* transceive at UHF 452.600 MHz, the radios of the law enforcement 134*a*–*b* transceive at HB 800 MHz, and the radios of the FAA 136 transceive at LB 30.600 MHz.

Law enforcement party 134*a*, FAA party 136, firefighting rescuer parties 130*a*–*b*, and paramedic party 132*a* are each operating within a general radius 138 surrounding the crash site 112 that is within the broadcasting range of their radios to a summit point 140. Each are out of broadcasting range of law enforcement party 134*b*, firefighting rescuer parties 130*c*–*d*, and paramedic party 132*b*, which are operating within a parachute search zone 142. However, the parachute search zone 142 is mostly within broadcasting range of the summit point 140 for the handheld transceiver radios of each party 134*b*, 130*c*–*d*, and 132*b*.

Emergency response parties operating equipment that is within range and transceiving at the same frequency will be able to communicate with each other. Consider the first ground fire 114 as firefighting rescuer party 130*b* arrives at the scene. It may be that the fire is more severe than originally thought. Firefighting rescuer party 130*b* is within the range 138 of firefighting rescuer party 130*a* and both parties are transceiving at the same type of signal, radio frequency VHF/LB 155.200 MHz. Firefighting rescuer party 130*b* can radio firefighting rescuer party 130*a* and request assistance.

Now consider the second fire 116 as firefighting rescuer party 130*c* arrives at the scene. It is known that firefighting rescuer party 130*d* is also en route to battle the second fire 116. However, firefighting rescuer party 130*c* discovers that the second fire 116 is minor and can be handled without further assistance. Firefighting rescuer party 130*c*, operating within range 142 of firefighting rescuer party 130*d* at VHF/LB 155.200 MHz, can radio firefighting rescuer party 130*d* and instruct the same that the fire is under control and that assistance should be given to paramedic parties 132*b*–*c* and law enforcement 134*b* in the search for the positions 118 and 120 of the parachutes.

Now consider firefighting rescuer party 130*d* as it attempts to coordinate its search with paramedic parties 132*b*–*c* and law enforcement 134*b*. The firefighting rescuer party 130*d* is within broadcasting range of the paramedic parties 132*b*–*c* and law enforcement 134*b*, but the radios of the paramedic parties 132*b*–*c* and the law enforcement 134*b* operate with second signal types, radio frequencies of UHF 452.600 MHz and HB 800 MHz, respectively. Therefore, the firefighting rescuer party 130*d* will not be able to coordinate its efforts without the assistance of a crossover repeater transceiver in the field. Thus, the deployment of the emergency response vehicle 11*b* is necessary for the monitoring and coordination of the response to an emergency of this type.

From the dirt path 122, the emergency response platform 11*b* enters a heavily wooded area 144, traversing rugged, off-trail terrain and thick underbrush. As described with respect to FIG. 4, in order to prevent damage to anemometer 40*b* and wind vane 42*b*, the detachable stand 27*b* will normally be dismounted from the cage 23*b* and stowed within the platform 11*b*. The cage 23*b* protects the operators within the platform 11*b* from snapping branches and other objects as the platform 11*b* crosses the heavily wooded area 144.

After penetrating the heavily wooded area 144, the platform 11*b* comes to the edge of a waterway 146 which may be a river that is sufficiently long long, wide, and deep to be impassible for normal land-based vehicles. The vehicle 10*b* of the platform 11*b* simply continues to drive straight into the waterway 146 until the entire platform 11*b* begins to float. If the platform 11*b* were being driven with wheels 13 and tires 21 only, the operator could simply continue to drive the vehicle 10*b* as if it were on land; the tread ribs 17 of the tires 21 would then act as oars and propel the platform 11*b* forward across the waterway 146. However, since tracks 15 have been added wheels 13, the operator reverses the direction of the tracks 15 once the platform 11*b* begins to float. The tracks 15 then propel the platform 11*b* forward across the water by being rotated in reverse. The tracks 15 can then be rotated in a forward direction once the platform 11*b* returns to the opposite bank of the waterway 146. No vehicle modification is required before entering the waterway or after returning to land.

Soon after crossing the waterway 146, the platform 11*b* encounters a terrain of deep sand dunes 148 and then a steep, muddy incline 150 before reaching the summit point 140. The tracks 15 or, if absent, multiple wheels 13 of the platform 11*b* provide sufficient traction to enable the vehicle to traverse each of these terrains. Since the operators, equipment, and mechanical components within the platform 11*b* are protected from water, rocks, and other external objects, the platform 11*b* arrives at the summit point 140 with little or no damage. Minimal platform set up is required before beginning the administration, command and control of the emergency situation. The summit point 140 is selected as a location for operations since it is a high elevation point and is generally within line of sight of both the radius 138 around the crash site 112 and the parachute search zone 142.

Having radio repeater transceivers 52 included within the platform 11b, the operator uses the microprocessor 30b to program the repeater transceivers 52 to receive incoming signals of a first signal type, in this case radio transmissions from the firefighting rescuer parties 130a–d at VHF/LB 155.200 MHz, and to regenerate and relay (rebroadcast) the signals of second signal types, in this case radio signals having frequencies of UHF 452.600 MHz, HB 800 MHz, and LB 30.600 MHz, receivable by the paramedic, law enforcement, and FAA parties 132a–c, 134a–b, and 136. As part of this crossover programming, the microprocessor 30b is also programmed to receive incoming signals of the second signal types, in this case radio signals having frequencies of UHF 452.600 MHz, HB 800 MHz, and LB 30.600 MHz, and to regenerate and relay the signals as signals of the first signal type, in this case radio transmissions from the firefighting rescuer parties 130a–d at VHF/LB 155.200 MHz. Full crossover would also be provided between the UHF 452.600 MHz, HB 800 MHz, and LB 30.600 MHz frequencies to allow the paramedic, law enforcement, and FAA parties 132a–c, 134a–b, and 136 to also communicate with each other in the field.

Now consider that, upon arriving at the crash site, the paramedic party 132a and law enforcement party 134a learn that two of the six passengers in the airplane 112 are not in the wreckage and have apparently parachuted out of the airplane before the crash. This may be crucial information for response parties in the parachute search zone 142 that are out of hand held broadcast range of the parachute search zone 142. This may also be important information for operators of a emergency aircraft 152 that, due to the speed of the emergency aircraft 152, tend to quickly enter and exit the broadcast ranges of any one handheld radio.

Due to its intermediate position on the summit point 140, the emergency response platform 11b is capable of serving as a repeater to relay incoming signals of any of the law enforcement, FAA, paramedic, and firefighting rescuer parties 130a–b, 132a, 134a, and 136 of the radius 138 around the crash site to any of the law enforcement, paramedic, and firefighting rescuer parties 130c–d, 132b, and 134b of the parachute search zone 142. Thus, the platform 11b can receive an incoming signal of a first signal type, that is any of the selected radio frequencies being utilized by the response parties, from the radius 138 around the crash site 112, and can regenerate, relay, and possibly amplify the signal as a first or second signal type, that is the same or any other type of selected radio frequency being utilized by the response parties, to the parachute search zone 142, and vice versa.

The ability of the platform 11b to move across difficult terrain to reach the intermediate position of the summit point 140 is essential to accomplish this aspect of the invention. Consider the trailer-based command center 126 located at the nearest dirt path 120. Such command centers will typically have an extensive suite of transceiver, crossover, and repeating equipment for coordinating mobile response activities. This may include equipment operating on the order of 100 watts or more and having the ability to broadcast for many tens of miles or more.

Although actual transmission ranges and equipment abilities would depend on specific equipment, circumstances, and current states of technology, respective equipment limitations would limit the ability for previous command centers to exchange signals with in-field parties, making use of the platform 11b advantageous. For example with reference to FIG. 1, the trailer-based command center 126 could have an approximate conventional radio broadcast transmission range limit 127 that extends well beyond both the radius 138 around the crash site 112 and parachute search zone 142. Thus, it may be possible for the trailer-based command center 126 to broadcast signals that are receivable by hand held transceivers of the response parties within the radius 138 of the crash site 112 and parachute search zone 142. However, such broadcasts would be strictly limited to one-way communications since the hand held transceivers would be unable to broadcast back to the trailer-based command center 126 for repeating and/or cross over broadcasting. The same could hold true for communications with an aircraft 152 which could enter and exit hand held broadcast range quickly due to its speed and flight path. The platform therefore provides a repeating and relay utility between response teams and the emergency aircraft 152 and trailer-based command center 126.

Now consider that, upon learning that only two passengers successfully parachuted from the airplane, the paramedic and law enforcement response parties 132b–c and 134b in the parachute search zone 142 realize that they have located all of the passengers at their respective landing sites. Meanwhile, firefighter rescuer party 130c radios firefighter rescuer party 130d to report that the second fire 116 has suddenly grown out of control and that further assistance will be needed. Paramedic parties 132a–c attend the passengers at their respective positions 118 and 120 and at the crash site 112.

The environmental monitoring station 38b (FIG. 7) is used by the operator of the platform 11b to relay pertinent environmental information such as the wind velocity 154 and temperature, to the firefighter rescuer parties 130a–d. If the airplane had been carrying hazardous cargo, such as chemical or radioactive substances, sensors on the environmental monitoring station 38b may be used to detect their presence in the environment as well. Such information could be relayed to a second location such as the trailer-based command center 126 in data files transmitted either by the multi-band radio 56 or via the satellite communication system 58 (both shown in FIG. 5), relayed by a satellite 156. If signals were to be relayed by the satellite 156, the signal could be transmitted to a third location hundreds or thousands of miles away from the summit point 140. Measured environmental data could also be manipulated by the operators of the platform 11b then relayed, along with appropriate instructions, via radio directly to the response parties in the field. Such information could also be relayed from the platform 11b to emergency aircraft 152.

Consider the discovery by paramedic party 132a that the passenger who parachuted to position 118 has a serious injury and is now a patient who needs prompt expert medical attention before being airlifted. The paramedic party 132a may know, from its communications with the operators of the platform 11b and the firefighter rescuer parties 130c–d that current wind velocity and the fire severity mean that the second fire 116 may shortly threaten their position 118. If the patient is suffering from apparent radiological, chemical, biological-induced symptoms, the paramedic party 132a may request that the operators of the platform 11b consult reference software on their microprocessor 30b (FIG. 5) containing highly specific information about poison-induced symptoms. The paramedic party 132a may also rely on expert medical advice located at the trailer-based command center 126 via relay from the platform 11b. If the conventional radio-based communication systems of the platform 11b fail, the platform operators may instead use the satellite communication system to relay voice and data information to the trailer-based command center 126 or to another remote location via the satellite 156.

If the paramedic party 132a or platform 11b is equipped with a visual imaging device such as an electronic camera, and if the patient can be possibly transported to a location that is sufficiently close to the visual imaging device to allow for such imaging, image data regarding the patient's condition can also be relayed to the appropriate expert medical authority via satellite.

The combination of extreme off-road capabilities, built-in protection to operators and passengers from external obstacles, and integrated communication and environmental monitoring technologies, and unobstructed perimeter views would also make the platform 11b ideal for use as a tactical assault vehicle. The platform 11b would be particularly effective for serving in a tactical assault situation where it would be necessary to conduct the administration and coordination of multiple assault parties that each possessed personal communication devices. The above-recited attributes of the invention would also allow the platform 11b to be useful for the communication or "call-in" of coordinates to appropriate control headquarters for use in the coordination and directing of air strikes against ground targets by both manned and unmanned aircraft.

Those skilled in the art will recognize that the various features of this invention described above can be used in various combinations with other elements without departing from the scope of the invention. Thus, the appended claims are intended to be interpreted to cover such equivalent mobile emergency response platforms that do not depart from the spirit and scope of the invention.

What is claimed is:

1. A mobile platform for conducting and monitoring in-field administration and coordination of emergency response activities comprising:

an all-terrain vehicle, said all-terrain vehicle having the capacity to accommodate at least two persons and having load bearing members that are one type selected from the group consisting of at least six wheels, at least two tracks, and a combination of a plurality of wheels and tracks, said all-terrain vehicle having the capability, without requiring in-field modification by an operator, of traversing multiple off-road surfaces that include each of sand, mud, snow, swampland, thickly wooded areas, ice, grasslands, man-made rubble and debris, surfaces having angles of about at least thirty degrees from horizontal, and floatably operating on waterways;

electronic communication equipment, said communication equipment having the capabilities of being moved across the multiple off-road surfaces with said platform to a first remote location, of receiving, while being located at the first remote location, at least two types of wireless communication transmissions from one or more additional remote locations, and, while being located at the first remote location, of transmitting at least two types of wireless communication transmissions from said mobile platform to the one or more additional remote locations;

said communication equipment having, while being located at the first remote location, the further capabilities of receiving an incoming signal of a first signal type and regenerating and relaying the incoming signal of the first signal type as a second signal type that is different from the first signal type, and of receiving an incoming signal of the second signal type and regenerating and relaying the incoming signal of the second signal type as a signal of the first signal type; and an environmental monitoring station having the capabilities of being moved across the multiple off-road surfaces with said platform to the first remote location and of measuring environmental conditions surrounding said platform.

2. The mobile platform of claim 1 wherein said communication equipment is capable of amplifying at least one of the incoming signals of the first signal type and of the second signal type when regenerating and relaying the incoming signals as transmitted signals.

3. The mobile platform of claim 1 wherein said load bearing members of said all-terrain vehicle exert a downward pressure of no more than about four pounds per square inch.

4. The mobile platform of claim 1 wherein said load bearing members of said all-terrain vehicle exert a downward pressure of no more than about one pound per square inch.

5. The mobile platform of claim 1 wherein said all-terrain vehicle has a length of no greater than about 15 feet.

6. The mobile platform of claim 1 wherein said electronic communication equipment has the capability of relaying signals received from a second remote location to a satellite for transmission by the satellite to a third remote location.

7. The mobile platform of claim 1 wherein said electronic communication equipment includes a cellular telephone.

8. The mobile platform of claim 1 wherein said electronic communication equipment includes a UHF/VHF radio.

9. The mobile platform of claim 1 wherein said electronic communication equipment includes a high band/low band radio.

10. The mobile platform of claim 1 further comprising a microprocessor, said microprocessor being interfaced with said electronic communication equipment to allow a user to electronically control said electronic communication equipment.

11. The mobile platform of claim 1 further comprising a microprocessor, said microprocessor being interfaced with said electronic communication equipment to receive information received by said electronic communication equipment as a signal of at least one of the first and second signal types and to allow an operator to electronically manipulate the information received.

12. The mobile platform of claim 1 further comprising a microprocessor, said microprocessor being interfaced with said electronic communication equipment to transfer information from said microprocessor to said electronic communication equipment for transmission as a signal of at least one of the first and second signal types to a second remote location.

13. The mobile platform of claim 1 further comprising a microprocessor, said microprocessor being interfaced with said environmental monitoring station to receive information of environmental conditions measured by said environmental monitoring station and to allow an operator to electronically manipulate the information received.

14. The mobile platform of claim 1 further comprising a microprocessor, said microprocessor being interfaced with said environmental monitoring station to receive information of environmental conditions measured by said environmental monitoring station, said microprocessor being further interfaced with said electronic communication equipment to allow said electronic communication equipment to transmit information of environmental conditions measured by said environmental monitoring station as a signal of at least one of the first and second signal types to a second remote location.

15. The mobile platform of claim 1 further comprising a microprocessor, said microprocessor having a wireless connection to the Internet.

16. The mobile platform of claim 1 wherein said electronic communication equipment has the capability of receiving signals from a satellite and relaying the signals from the satellite to a second remote location.

17. The mobile platform of claim 1 wherein said electronic communication equipment includes a satellite communication system having the capability of receiving signals from a satellite and relaying the signals from the satellite to a second remote location, said satellite communication system being self-contained in a handset.

18. The mobile platform of claim 1 wherein said electronic communication equipment includes a satellite communication system having the capability of receiving signals from a satellite and relaying the signals from the satellite to a second remote location, said satellite communication system being self-contained in a handset, said satellite communication system having a global positioning system contained therein.

19. The mobile platform of claim 1 wherein said electronic communication equipment includes a satellite communication system having the capability of receiving signals from a satellite and relaying the signals from the satellite to a second remote location, said satellite communication system having an antenna dish mounted on said platform.

20. The mobile platform of claim 1 wherein said electronic communication equipment includes a satellite communication system having the capability of receiving signals from a satellite and relaying the signals from the satellite to a second remote location, said satellite communication system having a folding, stand-alone dish antenna system.

21. The mobile platform of claim 1 wherein said electronic communication equipment has the capability of relaying signals to a satellite for transmission to a third remote location, said environmental monitoring station being electronically connected to said electronic communication equipment to allow information about measured environmental conditions to be transmitted through the satellite to the third remote location.

22. The mobile platform of claim 1 wherein said electronic communication equipment has the capability of relaying signals to a satellite for transmission to a third remote location, said mobile platform further comprising a microprocessor, said microprocessor being interfaced with said environmental monitoring station to receive information of environmental conditions measured by said environmental monitoring station, said microprocessor being further interfaced with said electronic communication equipment to allow said computer to transfer the information of measured environmental conditions to said electronic communication equipment for relaying to the satellite and transmission of the information to the third remote location.

23. The mobile platform of claim 1 further comprising a personal computer, said personal computer having emergency reference software loaded thereon that is accessible by an operator when said platform is at the first remote location.

24. The mobile platform of claim 1 further comprising a personal computer, said personal computer having topographical mapping software loaded thereon that is accessible by an operator when said platform is at the first remote location.

25. The mobile platform of claim 1 further comprising a ground penetrating radar system for detecting subterranean information.

26. The mobile platform of claim 1 further comprising a ground penetrating radar system for detecting subterranean information, said electronic communication equipment having the capability of transmitting subterranean information detected by said ground penetrating radar to a second remote location as at least one of said first and second signal types.

27. The mobile platform of claim 1 wherein said electronic communication equipment has the capability of relaying signals to a satellite for transmission to a third remote location, said mobile platform further comprising a ground penetrating radar system for detecting subterranean information, said electronic communication equipment having the capability of relaying subterranean information detected by said ground penetrating radar to the satellite for transmission to the third remote location.

28. The mobile platform of claim 1 further comprising a cage to protect passengers within said all-terrain vehicle, said cage having a frame that includes at least one roll bar, a brush guard for clearing obstacles from the path of the passengers during forward movement of said all terrain vehicle, and a mesh screen for protecting passengers from brush and debris from outside of said all-terrain vehicle.

29. The mobile platform of claim 1 further comprising a cage to protect passengers within said all-terrain vehicle, said cage having a frame that includes at least one roll bar, a brush guard for clearing obstacles from the path of the passengers during forward movement of said all terrain vehicle, and a mesh screen for protecting passengers from brush and debris from outside of said all-terrain vehicle, said cage having a construction that allows it to function as an amplifying antenna to improve the transmission and reception of radio signals by said electronic communication equipment of said platform.

30. The mobile platform of claim 1 wherein said all-terrain vehicle includes a body that encloses mechanical components of said vehicle to shield the mechanical components from external objects and water that said vehicle contacts when said vehicle travels across ground and waterways.

31. The mobile platform of claim 1 further comprising a megaphone for broadcasting audible signals from said platform.

32. The mobile platform of claim 1 further comprising a winch for pulling objects and for pulling said platform itself across terrain.

33. The mobile platform of claim 1 wherein said environmental monitoring station takes environmental measurements chosen from the group consisting of wind velocity, temperature, relative humidity, barometric pressure, the presence of radiation, the presence of chemical agents, the presence of biological agents, dew point, wind chill, heat index, rainfall, wind gusts, cloud base height, and air density.

34. The mobile platform of claim 1 wherein said environmental monitoring station includes an anemometer and a wind vane for measuring wind velocity.

35. The mobile platform of claim 1 wherein said environmental monitoring station includes an anemometer and a wind vane for measuring wind velocity, said anemometer and said wind vane being positioned on said platform with a removable stand.

36. The mobile platform of claim 1 wherein said electronic communication equipment further comprises a global positioning system.

37. The mobile platform of claim 1 further comprising an infrared vision device.

38. A mobile platform for conducting and monitoring in-field administration and coordination of emergency response activities comprising:

an all-terrain vehicle, said all-terrain vehicle having the capacity to accommodate at least two persons and having load bearing members that are one type selected from the group consisting of at least six wheels, at least two tracks, and a combination of a plurality of wheels and tracks, said all-terrain vehicle having the capability, without requiring in-field modification by an operator, of traversing multiple off-road surfaces that include each of sand, mud, snow, swampland, thickly wooded areas, ice, grasslands, man-made rubble and debris, surfaces having angles of about at least thirty degrees from horizontal, and floatably operating on waterways;

electronic communication equipment, said communication equipment having the capabilities of being moved across the multiple off-road surfaces with said platform to a first remote location, of receiving, while being located at the first remote location, at least two types of wireless communication transmissions from one or more additional remote locations, and, while being located at the first remote location, of transmitting at least two types of wireless communication transmissions from said mobile platform to the one or more additional remote locations;

said communication equipment having, while being located at the first remote location, the further capabilities of receiving an incoming signal of a first signal type and regenerating and relaying the incoming signal of the first signal type as a second signal type that is different from the first signal type, and of receiving an incoming signal of the second signal type and regenerating and relaying the incoming signal of the second signal type as a signal of the first signal type;

an environmental monitoring station having the capabilities of being moved across the multiple off-road surfaces with said platform to the first remote location and of measuring environmental conditions surrounding said platform; and electronic positioning equipment, said positioning equipment being capable of providing, at the first remote location, information about the position of said mobile platform.

39. The mobile platform of claim 38 wherein said communication equipment is capable of amplifying at least one of the incoming signals of the first signal type and of the second signal type when regenerating and relaying the incoming signals as transmitted signals.

40. The mobile platform of claim 38 wherein said load bearing members of said all-terrain vehicle exert a downward pressure of no more than about four pounds per square inch.

41. The mobile platform of claim 38 wherein said load bearing members of said all-terrain vehicle exert a downward pressure of no more than about one pound per square inch.

42. The mobile platform of claim 38 wherein said all-terrain vehicle has a length of no greater than about 15 feet.

43. The mobile platform of claim 38 wherein said electronic communication equipment has the capability of relaying signals received from a second remote location to a satellite for transmission by the satellite to a third remote location.

44. The mobile platform of claim 38 wherein said electronic communication equipment includes a cellular telephone.

45. The mobile platform of claim 38 wherein said electronic communication equipment includes a UHF/VHF radio.

46. The mobile platform of claim 38 wherein said electronic communication equipment includes a high band/low band radio.

47. The mobile platform of claim 38 further comprising a microprocessor, said microprocessor being interfaced with said electronic communication equipment to allow a user to electronically control said electronic communication equipment.

48. The mobile platform of claim 38 further comprising a microprocessor, said microprocessor being interfaced with said electronic communication equipment to receive information received by said electronic communication equipment as a signal of at least one of the first and second signal types and to allow an operator to electronically manipulate the information received.

49. The mobile platform of claim 38 further comprising a microprocessor, said microprocessor being interfaced with said electronic communication equipment to transfer information received from said microprocessor to said electronic communication equipment for transmission as a signal of at least one of the first and second signal types to a second remote location.

50. The mobile platform of claim 38 further comprising a microprocessor, said microprocessor being interfaced with said environmental monitoring station to receive information of environmental conditions measured by said environmental monitoring station and to allow an operator to electronically manipulate the information received.

51. The mobile platform of claim 38 further comprising a microprocessor, said microprocessor being interfaced with said environmental monitoring station to receive information of environmental conditions measured by said environmental monitoring station, said microprocessor being further interfaced with said electronic communication equipment to allow said electronic communication equipment to transmit information of environmental conditions measured by said environmental monitoring station as a signal of at least one of the first and second signal types to a second remote location.

52. The mobile platform of claim 38 further comprising a microprocessor, said microprocessor having a wireless connection to the Internet.

53. The mobile platform of claim 38 wherein said electronic communication equipment has the capability of receiving signals from a satellite and relaying the signals from the satellite to a second remote location.

54. The mobile platform of claim 38 wherein said electronic communication equipment includes a satellite communication system having the capability of receiving signals from a satellite and relaying the signals from the satellite to a second remote location, said satellite communication system being self-contained in a handset.

55. The mobile platform of claim 38 wherein said electronic communication equipment includes a satellite communication system having the capability of receiving signals from a satellite and relaying the signals from the satellite to a second remote location, said satellite communication system being self-contained in a handset, said satellite communication system having a global positioning system contained therein.

56. The mobile platform of claim 38 wherein said electronic communication equipment includes a satellite communication system having the capability of receiving signals from a satellite and relaying the signals from the satellite to a second remote location, said satellite communication system having an antenna dish mounted on said platform.

57. The mobile platform of claim 38 wherein said electronic communication equipment includes a satellite communication system having the capability of receiving signals from a satellite and relaying the signals from the satellite to a second remote location, said satellite communication system having a folding, stand-alone dish antenna system.

58. The mobile platform of claim 38 wherein said electronic communication equipment has the capability of relaying signals to a satellite for transmission to a third remote location, said environmental monitoring station being electronically connected to said electronic communication equipment to allow information about measured environmental conditions to be transmitted through the satellite to the third remote location.

59. The mobile platform of claim 38 wherein said electronic communication equipment has the capability of relaying signals to a satellite for transmission to a third remote location, said mobile platform further comprising a microprocessor, said microprocessor being interfaced with said environmental monitoring station to receive information of environmental conditions measured by said environmental monitoring station, said microprocessor being further interfaced with said electronic communication equipment to allow said computer to transfer the information of measured environmental conditions to said electronic communication equipment for relaying to the satellite and transmission of the information to the third remote location.

60. The mobile platform of claim 38 further comprising a personal computer, said personal computer having emergency reference software loaded thereon that is accessible by an operator when said platform is at the first remote location.

61. The mobile platform of claim 38 further comprising a personal computer, said personal computer having topographical mapping software loaded thereon that is accessible by an operator when said platform is at the first remote location.

62. The mobile platform of claim 38 further comprising a ground penetrating radar system for detecting subterranean information.

63. The mobile platform of claim 38 further comprising a ground penetrating radar system for detecting subterranean information, said electronic communication equipment having the capability of transmitting subterranean information detected by said ground penetrating radar to a second remote location as at least one of said first and second signal types.

64. The mobile platform of claim 38 wherein said electronic communication equipment has the capability of relaying signals to a satellite for transmission to a third remote location, said mobile platform further comprising a ground penetrating radar system for detecting subterranean information, said electronic communication equipment having the capability of relaying subterranean information detected by said ground penetrating radar to the satellite for transmission to the third remote location.

65. The mobile platform of claim 38 further comprising a cage to protect passengers within said all-terrain vehicle, said cage having a frame that includes at least one roll bar and a brush guard for clearing obstacles from the path of the passengers during forward movement of said all terrain vehicle, said cage having a mesh screen for protecting passengers from brush and debris from outside of said all-terrain vehicle.

66. The mobile platform of claim 38 further comprising a cage to protect passengers within said all-terrain vehicle, said cage having a frame that includes at least one roll bar, a brush guard for clearing obstacles from the path of the passengers during forward movement of said all terrain vehicle, and a mesh screen for protecting passengers from brush and debris from outside of said all-terrain vehicle, said cage having a construction that allows it to function as an amplifying antenna to improve the transmission and reception of radio signals by said electronic communication equipment of said platform.

67. The mobile platform of claim 38 wherein said electronic positioning equipment is interfaced to said communications equipment to allow the information about the position of said mobile platform, at the first remote location, to be transmitted by at least one of the first and second signal types to a second remote location.

68. The mobile platform of claim 38 wherein said electronic positioning equipment is interfaced to said communications equipment to allow the information about the position of said mobile platform, at the first remote location, to be transmitted by at least one of the first and second signal types to a second remote location.

69. The mobile platform of claim 38 wherein said electronic communication equipment has the capability of relaying signals to a satellite for transmission to a third remote location, said electronic positioning equipment is interfaced to said communications equipment to allow the information about the position of said mobile platform, at the first remote location, to be relayed to the satellite for transmission by the satellite to the third remote location.

70. The mobile platform of claim 38 further comprising a microprocessor, said microprocessor being interfaced with said electronic positioning equipment to receive information about the position of said mobile platform at the first remote location and to allow an operator to electronically manipulate the information received.

71. The mobile platform of claim 38 further comprising a microprocessor, said electronic communication equipment having the capability of relaying signals to a satellite for transmission to a third remote location, said microprocessor being interfaced to said electronic communication equipment and to said electronic positioning equipment to allow said microprocessor to receive and transfer information about the position of said mobile platform for relaying to the satellite for transmission of the information to the third remote location.

72. The mobile platform of claim 38 wherein said all-terrain vehicle includes a body that encloses mechanical components of said vehicle to shield the mechanical components from external objects and water that said vehicle contacts when said vehicle travels across ground and waterways.

73. The mobile platform of claim 38 further comprising a megaphone for broadcasting audible signals from said platform.

74. The mobile platform of claim 38 further comprising a winch for pulling objects and for pulling said platform itself across terrain.

75. The mobile platform of claim 38 wherein said environmental monitoring station takes environmental measurements chosen from the group consisting of wind velocity, temperature, relative humidity, barometric pressure, the presence of radiation, the presence of chemical agents, the presence of biological agents, dew point, wind chill, heat index, rainfall, wind gusts, cloud base height, and air density.

76. The mobile platform of claim 38 wherein said environmental monitoring station includes an anemometer and a wind vane for measuring wind velocity.

77. The mobile platform of claim 38 wherein said environmental monitoring station includes an anemometer and a wind vane for measuring wind velocity, said anemometer and said wind vane being positioned on said platform with a removable stand.

78. The mobile platform of claim 38 wherein said electronic communication equipment further comprises a global positioning system.

79. The mobile platform of claim 38 wherein said electronic positioning equipment further comprises a global positioning system.

80. The mobile platform of claim 38 further comprising an infrared vision device.

81. A method of conducting and monitoring in-field administration and coordination of emergency response activities on a mobile platform comprising:
    providing an all-terrain vehicle to accommodate and transport at least two persons to a remote in-field location, the all-terrain vehicle serving as a vehicle for the mobile platform and having load bearing members that are one type selected from the group consisting of at least six wheels, at least two tracks, and a combination of a plurality of wheels and tracks, said all-terrain vehicle having the capability, without requiring in-field modification by an operator, of traversing multiple off-road surfaces that include each of sand, mud, snow, swampland, thickly wooded areas, ice, grasslands, man-made rubble and debris, surfaces having angles of about at least thirty degrees from horizontal, and floatably operating on waterways;
    providing electronic communication equipment in the mobile platform and using the capability of the mobile platform to traverse multiple off-road surfaces to move the electronic communication equipment to a first remote location;
    using the communication equipment to receive, at the first remote location, at least two types of wireless communication transmissions from one or more additional remote locations, and using the communication equipment to transmit at least two types of wireless communication transmissions from the mobile platform to the one or more additional remote locations, using said communication equipment to receive a first signal type and to regenerate and relay said first signal type as a second signal type that is different from said first signal type, using said communication equipment to receive said second signal type and regenerate and relay said second signal type as said first signal type; and
    providing an environmental monitoring station in the platform, using the monitoring station to measure environmental conditions surrounding the platform, and using the electronic communication equipment to transmit measurements taken by the monitoring station.

82. The method of conducting and monitoring in-field administration and coordination of emergency response activities of claim 81 further comprising providing electronic positioning equipment in the mobile platform and using the positioning equipment to provide information of the position of the mobile platform to a remote location through the electronic communication equipment.

83. The method of conducting and monitoring in-field administration and coordination of emergency response activities of claim 81 further comprising using the platform as a tactical assault vehicle.

84. The method of conducting and monitoring in-field administration and coordination of emergency response activities of claim 81 further comprising amplifying with said communication equipment at least one of the incoming signals of the first signal type and of the second signal type when regenerating and relaying the incoming signals as transmitted signals.

85. The method of conducting and monitoring in-field administration and coordination of emergency response activities of claim 81 further comprising using the electronic communication equipment to relay signals received from a second remote location to a satellite for transmission by the satellite to a third remote location.

86. The method of conducting and monitoring in-field administration and coordination of emergency response activities of claim 81 further comprising using a microprocessor to electronically control the electronic communication equipment.

87. The method of conducting and monitoring in-field administration and coordination of emergency response activities of claim 81 further comprising:
    interfacing a microprocessor to receive information received by said electronic communication equipment as a signal of at least one of the first and second signal types; and
    electronically manipulating the information received with the microprocessor.

88. The method of conducting and monitoring in-field administration and coordination of emergency response activities of claim 81 further comprising:
    interfacing a microprocessor with the electronic communication equipment to transfer information from the microprocessor to the electronic communication equipment; and
    transmitting information from the microprocessor with the electronic communication equipment as a signal of at least one of the first and second signal types to a second remote location.

89. The method of conducting and monitoring in-field administration and coordination of emergency response activities of claim 81 further comprising:
    interfacing a microprocessor with the environmental monitoring station to receive information of environmental conditions measured by the environmental monitoring station; and
    electronically manipulating the information of environmental conditions measured by the environmental monitoring station with the microprocessor.

90. The method of conducting and monitoring in-field administration and coordination of emergency response activities of claim 81 further comprising:
    interfacing a microprocessor with an environmental monitoring station to receive information of environmental conditions measured by the environmental monitoring station; and
    interfacing said microprocessor with said electronic communication equipment to allow said electronic communication equipment to transmit the information of the environmental conditions as a signal of at least one of the first and second signal types to a second remote location.

91. The method of conducting and monitoring in-field administration and coordination of emergency response activities of claim 81 further comprising using the electronic communication equipment to receive signals from a satellite and to relay the signals from the satellite to a second remote location.

92. The method of conducting and monitoring in-field administration and coordination of emergency response activities of claim 81 further comprising:
    interfacing the electronic communication equipment to the environmental monitoring station to allow information about measured environmental conditions to be transmitted to a satellite; and
    using the satellite to relay the information to a third remote location.

93. The method of conducting and monitoring in-field administration and coordination of emergency response activities of claim 81 further comprising:

interfacing a microprocessor to the environmental monitoring station to receive information of environmental conditions measured by the environmental monitoring station; and interfacing the microprocessor to the electronic communication equipment to allow the computer to transfer the information of the environmental conditions to the electronic communication equipment for relaying to a satellite and transmission of the information to a third remote location.

94. The method of conducting and monitoring in-field administration and coordination of emergency response activities of claim 81 further comprising using a ground penetrating radar to detect subterranean information.

95. The method of conducting and monitoring in-field administration and coordination of emergency response activities of claim 81 further comprising:

using a ground penetrating radar to detect subterranean information; and using the electronic communication equipment to transmit the detected subterranean information to a second remote location as at least one of the first and second signal types.

96. The method of conducting and monitoring in-field administration and coordination of emergency response activities of claim 81 further comprising:

using a ground penetrating radar to detect subterranean information; and using the electronic communication equipment to relay the information about the detected subterranean information to a satellite for transmission to a third remote location.

97. The method of conducting and monitoring in-field administration and coordination of emergency response activities of claim 81 further comprising protecting passengers within the all-terrain vehicle with a cage by using the cage to clear obstacles and debris from the path of the passengers during forward movement of the mobile platform.

98. A mobile platform for conducting and monitoring in-field administration and coordination of emergency response activities comprising:

an all-terrain vehicle, said all-terrain vehicle having the capacity to accommodate multiple persons and having load bearing members that are one type selected from the group consisting of at least six wheels, at least two tracks, and a combination of a plurality of wheels and tracks, said all-terrain vehicle having the capability, without requiring in-field modification by an operator, of traversing multiple off-road surfaces that include each of sand, mud, snow, swampland, thickly wooded areas, ice, grasslands, man-made rubble and debris, surfaces having angles of about at least thirty degrees from horizontal, and floatably operating on waterways, said vehicle having a body that encloses mechanical components of said vehicle to shield the mechanical components from external objects and water that said vehicle contacts when said vehicle travels across ground and waterways;

electronic communication equipment, said communication equipment being movable across the multiple off-road surfaces with said platform to a first remote location, of receiving, while being located at the first remote location, wireless communication transmissions from one or more additional remote locations, and, while being located at the first remote location, of transmitting wireless communication transmissions from said mobile platform to the one or more additional remote locations;

said communication equipment having, while being located at the first remote location, the capabilities of receiving an incoming signal of a first signal type and regenerating and relaying the incoming signal of the first signal type as a second signal type that is different from the first signal type, and of receiving an incoming signal of the second signal type and regenerating and relaying the incoming signal of the second signal type as a signal of the first signal type, said communication equipment being further capable of amplifying the incoming signals of the first signal type and of the second signal type when regenerating and relaying the incoming signals as transmitted signals;

an environmental monitoring station that is capable of moving across the multiple off-road surfaces with said platform to the first remote location and of measuring environmental conditions surrounding said platform, said environmental monitoring station being electronically connected to said electronic communication equipment to allow information about measured environmental conditions to be transmitted there through;

a microprocessor, said microprocessor being interfaced with said electronic communication equipment to allow a user to electronically control said electronic communication equipment and to receive information received by said electronic communication equipment as a signal of at least one of the first and second signal types and to allow an operator to electronically manipulate the information received, said microprocessor being interfaced with said environmental monitoring station to receive information of measured environmental conditions, said microprocessor being capable of transferring information from said microprocessor to said electronic communication equipment for transmission as a signal of at least one of the first and second signal types to one or more additional remote locations;

said electronic communication equipment having the capability of relaying received signals to a satellite for transmission by the satellite to a third remote location, said electronic communications equipment having the capability of receiving information from the satellite and transferring the information from the satellite to said microprocessor, said electronic communication equipment having the capability of relaying information received from the satellite to one or more remote locations; and electronic positioning equipment, said positioning equipment being capable of providing, at the first remote location, information about the position of said mobile platform, said positioning equipment being capable of transferring the information about the position of said mobile platform to said communication equipment for transmission to a remote location.

99. A mobile platform for conducting and monitoring in-field administration and coordination of emergency response activities comprising:

an all-terrain vehicle, said all-terrain vehicle having the capacity to accommodate at least two persons and having load bearing members that are one type selected from the group consisting of at least six wheels, at least two tracks, and a combination of a plurality of wheels and tracks, said all-terrain vehicle having the capability, without requiring in-field modification by an operator, of traversing multiple off-road surfaces that include each of sand, mud, snow, swampland, thickly wooded areas, ice, grasslands, man-made rubble and debris, surfaces having angles of about at least thirty degrees from horizontal, and floatably operating on waterways, said vehicle having mechanical components that are shielded from external objects and water that said vehicle contacts when said vehicle travels across ground and waterways;

mobile electronic communication equipment, said communication equipment being included on said platform and having the capabilities of being moved across the multiple off-road surfaces with said platform to a first remote location, of receiving, while being located at the first remote location, at least two types of wireless communication transmissions from one or more additional remote locations, and, while being located at the first remote location, of transmitting at least two types of wireless communication transmissions from said mobile platform to the one or more additional remote locations;

said communication equipment having, while being located at the first remote location, the further capabilities of receiving incoming signals of a first signal type and regenerating and relaying the incoming signals of the first signal type as a second signal type that is different from the first signal type, and of receiving incoming signals of the second signal type and regenerating and relaying the incoming signals of the second signal type as signals of the first signal type, said communication equipment being capable of amplifying at least one of the incoming signals of the first signal type and of the second signal type when regenerating and relaying the incoming signals as transmitted signals;

an environmental monitoring station having the capabilities of being moved across the multiple off-road surfaces with said platform to the first remote location and of measuring environmental conditions surrounding said platform, said environmental monitoring station being electronically connected to said electronic communication equipment to allow information about measured environmental conditions to be transmitted from said monitoring station to said communication equipment;

a microprocessor, said microprocessor being interfaced with said electronic communication equipment to allow a user to electronically control said electronic communication equipment and to receive information received by said electronic communication equipment as a signal of at least one of the first and second signal types and to allow an operator to electronically manipulate the information received, said microprocessor being interfaced with said environmental monitoring station to receive information of measured environmental conditions, said microprocessor being capable of transferring information from said microprocessor to said electronic communication equipment for transmission as a signal of at least one of the first and second signal types to one or more additional remote locations;

said electronic communication equipment having the capability of relaying received signals to a third remote location via a satellite, said electronic communications equipment having the further capability of receiving information from the satellite and transferring the information from the satellite to said microprocessor, and subsequently relaying the information received from the satellite to one or more remote locations; and electronic positioning equipment, said positioning equipment being capable of providing, at the first remote location, information about the position of said mobile platform, said positioning equipment being capable of transferring the information about the position of said mobile platform to said communication equipment for transmission to a remote location, said communication equipment capable of transmitting the information about the position of the mobile platform via a satellite.

100. A mobile platform for conducting and monitoring in-field administration and coordination of emergency response activities comprising:

an all-terrain vehicle, said all-terrain vehicle having the capacity to accommodate multiple persons and having load bearing members that are one type selected from the group consisting of at least six wheels, at least two tracks, and a combination of a plurality of wheels and tracks, said all-terrain vehicle having the capability, without requiring in-field modification by an operator, of traversing multiple off-road surfaces that include each of sand, mud, snow, swampland, thickly wooded areas, ice, grasslands, man-made rubble and debris, surfaces having angles of about at least thirty degrees from horizontal, and floatably operating on waterways, said vehicle having a body that encloses mechanical components of said vehicle to shield the mechanical components from external objects and water that said vehicle contacts when said vehicle travels across ground and waterways, said vehicle having a cage to protect passengers within said vehicle, said cage having a frame that includes at least one roll bar, a brush guard for clearing obstacles from the path of the passengers during forward movement of said vehicle, and a mesh screen for protecting passengers from brush and debris from outside of said vehicle;

electronic communication equipment, said communication equipment being movable across the multiple off-road surfaces with said platform to a first remote location, of receiving, while being located at the first remote location, wireless communication transmissions from one or more additional remote locations, and, while being located at the first remote location, of transmitting wireless communication transmissions from said mobile platform to the one or more additional remote locations;

said communication equipment having, while being located at the first remote location, the capabilities of receiving an incoming signal of a first signal type and regenerating and relaying the incoming signal of the first signal type as a second signal type that is different from the first signal type, and of receiving an incoming signal of the second signal type and regenerating and relaying the incoming signal of the second signal type as a signal of the first signal type, said communication equipment being further capable of amplifying the incoming signals of the first signal type and of the second signal type when regenerating and relaying the incoming signals as transmitted signals;

an environmental monitoring station that is capable of moving across the multiple off-road surfaces with said platform to the first remote location and of measuring environmental conditions surrounding said platform, said environmental monitoring station being electronically connected to said electronic communication equipment to allow transmission there through of information about measured environmental conditions;

a microprocessor, said microprocessor being interfaced with said electronic communication equipment to allow a user to electronically control said electronic communication equipment and to receive information received by said electronic communication equipment as a signal of at least one of the first and second signal types and to allow an operator to electronically manipulate the information received, said microprocessor being interfaced with said environmental monitoring station to receive information of measured environmental conditions, said microprocessor being capable of transferring information from said microprocessor to said electronic communication equipment for transmission as a signal of at least one of the first and second signal types to one or more additional remote locations;

said electronic communication equipment having the capability of relaying received signals to a satellite for transmission by the satellite to a third remote location, said electronic communications equipment having the capability of receiving information from the satellite and transferring the information from the satellite to said microprocessor, said electronic communication equipment having the capability of relaying information received from the satellite to one or more remote locations; and electronic positioning equipment, said positioning equipment being capable of providing, at the first remote location, information about the position of said mobile platform, said positioning equipment being capable of transferring the information about the position of said mobile platform to said communication equipment for transmission to a remote location.

101. A mobile platform for conducting and monitoring in-field administration and coordination of emergency response activities comprising:

an all-terrain vehicle, said all-terrain vehicle having the capacity to accommodate at least two persons and having load bearing members that are one type selected from the group consisting of at least six wheels, at least two tracks, and a combination of a plurality of wheels and tracks, said all-terrain vehicle having the capability, without requiring in-field modification by an operator, of traversing multiple off-road surfaces that include each of sand, mud, snow, swampland, thickly wooded areas, ice, grasslands, man-made rubble and debris, surfaces having angles of about at least thirty degrees from horizontal, and floatably operating on waterways, said vehicle having a body that encloses mechanical components of said vehicle to shield the mechanical components from external objects and water that said vehicle contacts when said vehicle travels across ground and waterways, said vehicle having a cage to protect passengers within said vehicle, said cage having a frame that includes at least one roll bar, a brush guard for clearing obstacles from the path of the passengers during forward movement of said vehicle, and a mesh screen for protecting passengers from brush and debris from outside of said vehicle;

electronic communication equipment, said communication equipment having the capabilities of being moved across the multiple off-road surfaces with said platform to a first remote location, of receiving, while being located at the first remote location, at least two types of wireless communication transmissions from one or more additional remote locations, and, while being located at the first remote location, of transmitting at least two types of wireless communication transmissions from said mobile platform to the one or more additional remote locations;

said communication equipment having, while being located at the first remote location, the further capabilities of receiving an incoming signal of a first signal type and regenerating and relaying the incoming signal of the first signal type as a second signal type that is different from the first signal type, and of receiving an incoming signal of the second signal type and regenerating and relaying the incoming signal of the second signal type as a signal of the first signal type, said communication equipment being capable of amplifying at least one of the incoming signals of the first signal type and of the second signal type when regenerating and relaying the incoming signals as transmitted signals;

an environmental monitoring station having the capabilities of being moved across the multiple off-road surfaces with said platform to the first remote location and of measuring environmental conditions surrounding said platform, said environmental monitoring station being electronically connected to said electronic communication equipment to allow information about measured environmental conditions to be transmitted there through;

a microprocessor, said microprocessor being interfaced with said electronic communication equipment to allow a user to electronically control said electronic communication equipment and to receive information received by said electronic communication equipment as a signal of at least one of the first and second signal types and to allow an operator to electronically manipulate the information received, said microprocessor being interfaced with said environmental monitoring station to receive information of measured environmental conditions, said microprocessor being capable of transferring information from said microprocessor to said electronic communication equipment for transmission as a signal of at least one of the first and second signal types to one or more additional remote locations;

a ground penetrating radar system for detecting subterranean information, said electronic communication equipment having the capability of transmitting subterranean information detected by said ground penetrating radar to a second remote location as at least one of said first and second signal types;

said electronic communication equipment having the capability of relaying received signals to a satellite for transmission by the satellite to a third remote location, said electronic communications equipment having the capability of receiving information from the satellite and transferring the information from the satellite to said microprocessor, said electronic communication equipment having the capability of relaying information received from the satellite to one or more remote locations; and electronic positioning equipment, said positioning equipment being capable of providing, at the first remote location, information about the position of said mobile platform, said positioning equipment being capable of transferring the information about the position of said mobile platform to said communication equipment for transmission to a remote location, said communication equipment being capable of transmitting the information about the position of the mobile platform via a satellite.

* * * * *